US012743907B2

(12) United States Patent
Alibeigi et al.

(10) Patent No.: US 12,743,907 B2
(45) Date of Patent: Sep. 22, 2026

(54) DETECTING AND COLLECTING ACCIDENT RELATED DRIVING EXPERIENCE EVENT DATA

(71) Applicant: ZENSEACT AB, Gothenburg (SE)

(72) Inventors: Mina Alibeigi, Gothenburg (SE); Majid Khorsand Vakilzadeh, Mölndal (SE)

(73) Assignee: ZENSEACT AB, Gothenburg (SE)

( * ) Notice: Subject to any disclaimer, the term of this patent is extended or adjusted under 35 U.S.C. 154(b) by 899 days.

(21) Appl. No.: 17/686,481

(22) Filed: Mar. 4, 2022

(65) Prior Publication Data

US 2022/0284744 A1 Sep. 8, 2022

(30) Foreign Application Priority Data

Mar. 4, 2021 (EP) .................................... 21160718

(51) Int. Cl.
*G07C 5/00* (2006.01)
*G06F 11/34* (2006.01)
(Continued)

(52) U.S. Cl.
CPC .......... *G07C 5/008* (2013.01); *G06F 11/3495* (2013.01); *G07C 5/10* (2013.01); *G06Q 50/265* (2013.01)

(58) Field of Classification Search
CPC ....... G07C 5/008; G07C 5/10; G06F 11/3495; G06F 18/24133; G06Q 50/265; G06V 20/59; G06V 20/56; G06N 20/00
See application file for complete search history.

(56) References Cited

U.S. PATENT DOCUMENTS 7,034,668 B2 4/2006 Engelman et al.
2018/0075309 A1* 3/2018 Sathyanarayana ... G05D 1/0088
(Continued)

FOREIGN PATENT DOCUMENTS

CN 109814520 A 5/2019
WO 2020/026318 A1 2/2020

OTHER PUBLICATIONS

Extended European Search Report mailed Sep. 3, 2021 for European Application No. 21160718.9, 9 pages.
(Continued)

*Primary Examiner* — Helal A Algahaim
(74) *Attorney, Agent, or Firm* — Sage Patent Group

(57) ABSTRACT

A computer-implemented method and related aspects for detecting and collecting accident-related driving data on a vehicle are included. The method includes receiving a driving experience data stream from a source on-board the vehicle, determining an accident similarity score for a data segment of the driving experience data stream, wherein the accident similarity score is based on a similarity measurement of data features extracted from the data segment to data features of a historic accident or near-accident driving experience event, determining a criticality score for the data segment, and storing, in dependence on at least one of the determined accident similarity score and the determined criticality score, at least the extracted data features from the data segment as an accident-related driving experience event in association with at least the determined criticality score.

11 Claims, 9 Drawing Sheets

(51) Int. Cl.
*G07C 5/10* (2006.01)
*G06Q 50/26* (2012.01)

(56) References Cited

U.S. PATENT DOCUMENTS

2018/0165531 A1 6/2018 Sathyanarayana et al.
2020/0062249 A1* 2/2020 Light et al. ............ G08G 1/017

OTHER PUBLICATIONS

Andersson, Andreas; "Multi-Target Threat Assessment for Autonomous Emergency Braking"; Masters Thesis, Chalmers University of Technology; Gothenburg, Sweden; 2016; 102 pages.
Cao, Zhangjie et al.; "Reinforcement Learning based Control of Imitative Policies for Near-Accident Driving"; Proceedings of Robotics: Science and Systems, Jul. 2020; 10 pages.
"Carlo 2D Driving Simulator"; https://github.com/Stanford-ILIAD/CARLO; 2020; 4 pages.
Erafani, Sarah et al.; "High-Dimensional and Large-Scale Anomaly Detection Using a Linear One-Class SVM with Deep Learning"; Pattern Recognition 58; Feb. 27, 2016; 37 pages.
Ruff, Lukas et al.; "Deep One-Class Classification"; Proceedings of the 35th International Conference on Machine earning; Stockholm, Sweden; PMLR 80, 2018; 10 pages.

* cited by examiner

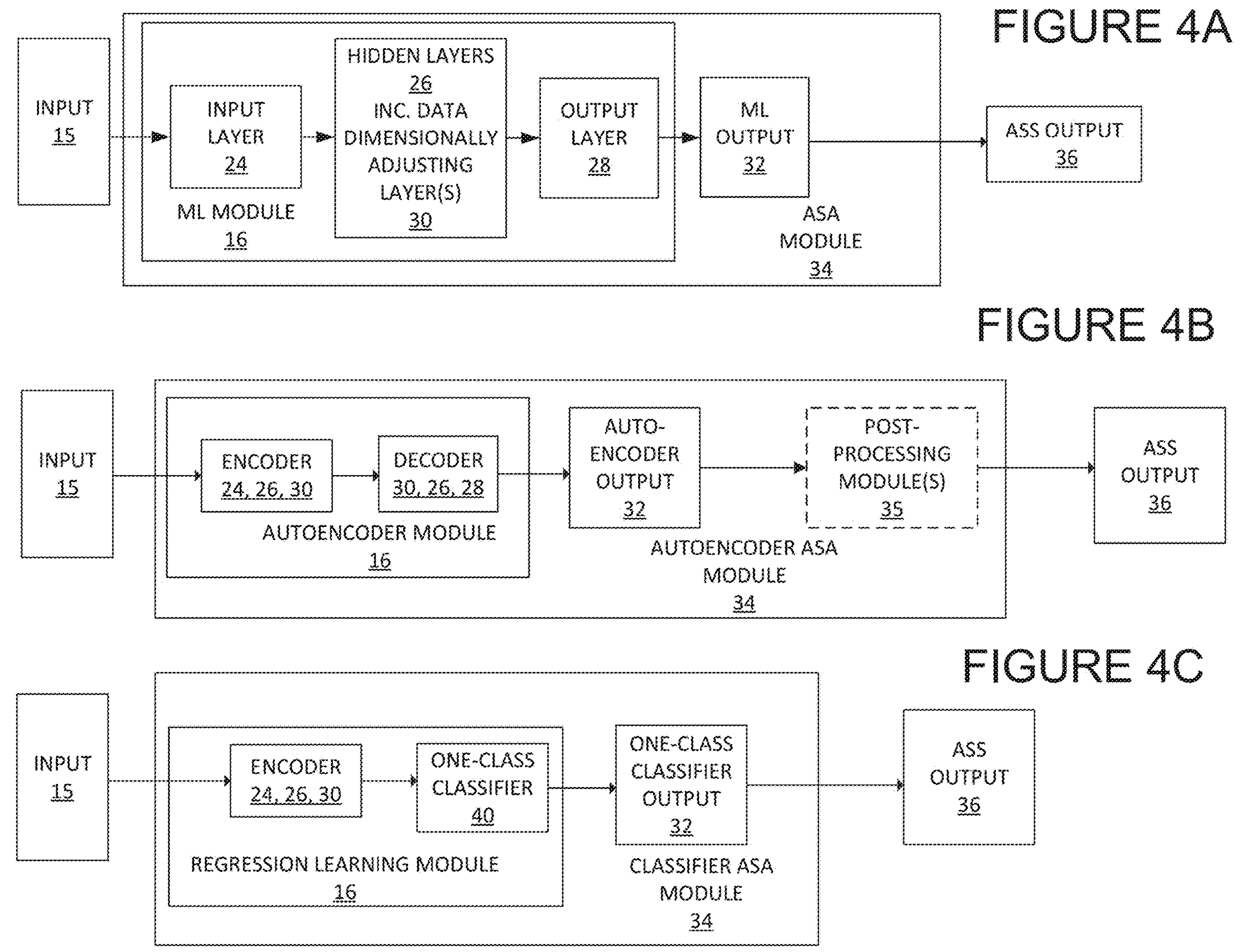
FIGURE 4A
INPUT 15
INPUT LAYER 24
ML MODULE 16
HIDDEN LAYERS 26 INC. DATA DIMENSIONALLY ADJUSTING LAYER(S) 30
OUTPUT LAYER 28
ML OUTPUT 32
ASA MODULE 34
ASS OUTPUT 36
FIGURE 4B
INPUT 15
ENCODER 24, 26, 30
DECODER 30, 26, 28
AUTOENCODER MODULE 16
AUTO-ENCODER OUTPUT 32
POST-PROCESSING MODULE(S) 35
AUTOENCODER ASA MODULE 34
ASS OUTPUT 36
FIGURE 4C
INPUT 15
ENCODER 24, 26, 30
ONE-CLASS CLASSIFIER 40
REGRESSION LEARNING MODULE 16
ONE-CLASS CLASSIFIER OUTPUT 32
CLASSIFIER ASA MODULE 34
ASS OUTPUT 36

DETECTING AND COLLECTING ACCIDENT RELATED DRIVING EXPERIENCE EVENT DATA

CROSS-REFERENCE TO RELATED APPLICATIONS

The present application for patent claims priority to European Patent Office Application Ser. No. 21160718.9, entitled "Detecting and Collecting Accident Related Driving Experience Event Data" filed on Mar. 4, 2021, assigned to the assignee hereof, and expressly incorporated herein by reference.

TECHNICAL FIELD

The disclosed technology relates to a method for detecting and collecting accident-related driving experience event data, for example, for subsequent analysis and to related aspects. In particular, but not exclusively, a method for a vehicle to detect and label accident related driving experience event data which comprises driving experience event data associated with accidents and near-accidents is disclosed.

BACKGROUND

Vehicles which are equipped with an advanced driver-assistance systems (ADASs) and/or autonomous driver (AD) systems, collectively referred to herein as advanced driver systems ADSs, generate huge amounts of sensor related data as they are driven around. When seeking to detect a rare event such as an accident or near-accident, a lot of event data must be processed to find the rare events of possible interest. In order to build up a useful amount of an accident-related driving event data for analysis more quickly, data from a large number of different vehicles can be collected. However, to avoid each vehicle transferring large amounts of data which may not be of interest to a remote server for analysis, it is desirable to limit the amount of data transferred to just the relevant driving experience events of interest for subsequent analysis on each vehicle.

Many ways of detecting if a vehicle has had an accident such as a collision with another vehicle or a pedestrian on a vehicle are known. Some techniques however rely on the presence of a collision to detect an accident and are not easily adapted to detect near-accidents where no collision occurs. Some techniques may only be able to detect certain types of accidents and cannot detect new types of accidents.

The present disclosure seeks to mitigate, alleviate or eliminate one or more of the above-identified deficiencies and disadvantages in the prior art to address various problems relating to a vehicle detecting and collecting rare driving experience events such as accidents or near accidents.

Various aspects and preferred embodiments of the disclosed invention are defined below and in the accompanying independent and dependent claims.

A first aspect of the disclosed technology comprises a computer-implemented method for detecting and collecting accident-related driving experience event data on a vehicle, the method comprising: receiving a driving experience data stream from a source on-board the vehicle; determining an accident similarity score for a data segment of the driving experience data stream, wherein the accident similarity score is based a similarity measurement of data features extracted from the data segment to data features of historical accident or near-accident driving experience events; determining a criticality score for the data segment; and storing, in dependence on at least one of the determined accident similarity score and the determined criticality score, at least the extracted data features from the data segment as an accident-related driving experience event in association with at least the determined criticality score.

The storing may comprise storing at least the extracted data features as an accident-related driving experience event based on the accident similarity score meeting a similarity accident score condition.

The storing may also instead or in addition comprise storing the data segment including the extracted data features as an accident-related driving experience event based on the determined criticality score of the data segment meeting a criticality score condition.

The method may also further comprise, responsive to a triggering event, sending data comprising at least one stored accident-related driving experience event to a remote server.

The source on-board the vehicle of the driving experience data stream may be an on-board ADS and wherein the driving experience data stream comprises situational, environmental and behavioral object-level sensory information and the data features extracted from the data segment represent one or more or all of: driver state features; occupant state features; behavioural features, including vehicle state and other objects; environmental features; and situational features.

Determining the accident similarity score of the data segment may comprise: inputting the data segment into an accident similarity assessment module comprising a machine learning model trained to extract features from the input data segment using historic accident or historic near-accident driving experience event data; extracting features from the data segment using the accident similarity assessment module; and determining the accident similarity score for the data segment based on a measurement of the similarity of the extracted features with historic accident and historic near-accident driving experience event features.

The method may further comprise, based on the determined accident similarity score not meeting a threshold score condition for the data segment to be associated with a historic accident or a near-accident driving experience event: determining, based on the criticality score meeting a threshold criticality score condition, the data segment comprises a different type of accident or near accident driving experience event to the historic accident or near-accident event.

Determining an accident similarity score and/or determining a criticality score for a data segment of the data stream may comprise determining an accident similarity score and/or a criticality score for each of a plurality of time-sequential data segments.

The criticality score may be dependent on a set of one or more accident criticality parameters representing one or more of: sensory information for the proximity of objects in the surrounding environment of the vehicle; object-level behavioural features; internal vehicle state features; vehicle state features; one or more occupant states; and a driver state.

The criticality score may be determined by inputting the set of accident criticality parameters into a deterministic, probabilistic and/or statistical, accident criticality assessment module.

A second aspect of the disclosed technology comprises a control system of a vehicle 1, the control system comprising: a memory; a controller or control circuitry comprising one or more processors or processing circuitry; computer code stored in the memory, wherein, when the computer code is loaded from the memory and executed by the one or more processors or processing circuitry of the controller or control circuitry, the control system is caused to perform a method according to the first aspect or any of its disclosed embodiments. For example, the control system or the control circuitry may comprise means or one or more modules configured to receive a driving experience data stream from a source on-board the vehicle; means or one or more modules configured to determine an accident similarity score for a data segment of the driving experience data stream, wherein the accident similarity score is based a similarity measurement of data features extracted from the data segment to data features of historical accident or near-accident driving experience events; determining a criticality score for the data segment; and means or one or more modules configured to store, in dependence on at least one of the determined accident similarity score and the determined criticality score, at least the extracted data features from the data segment as an accident-related driving experience event in association with at least the determined criticality score.

A third aspect of the disclosed technology comprises a ground vehicle, the vehicle comprising: a perception system comprising at least one sensor configured to monitor a surrounding environment of the ground vehicle and generate a sensor data stream; a localization system configured to monitor a geographical map position of the ground vehicle 1 and to generate a localization data stream; a data transceiver configurable to transmit to, and receive data from, a remote server; and a control system according to the second aspect or any of its disclosed embodiments.

A fourth aspect of the disclosed technology comprises a computer-implemented method 200 for collecting accident-related driving experience event data from a plurality of vehicles, the method comprising: receiving, responsive to a data transfer triggering event occurring on at least one of the plurality of vehicles, data comprising at least one accident-related driving experience event that the vehicle has detected in a data stream of driving experience events generated on-board the vehicle and an associated criticality score for each received accident-related driving experience event; and storing the received accident-related driving experience event data in one or more fleet accident-related experience data libraries.

Each received accident-related driving experience event may comprise a data segment and at least an accident similarity score and an accident criticality score of the data segment.

A fifth aspect of the disclosed technology may comprise a server for collecting accident-related driving experience event data from a plurality of vehicles, the server comprising: a memory; a control circuitry comprising one or more processors or processing circuitry; and computer code stored in the memory, wherein, when the computer code is loaded from the memory and executed by the one or more processors or processing circuitry of the control circuitry or controller, the server is caused to: receive, responsive to a data transfer triggering event occurring on one of the plurality of vehicles, data comprising at least one accident-related driving experience event that the vehicle has detected in a data stream of driving experience events generated on-board the vehicle together with an associated criticality score for each of the at least one accident related-driving experience event; and store the received accident-related driving experience event data with accident-related driving experience event data from at least one other vehicle.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

LIST OF FIGURES

The above aspects, features and advantages of the disclosed technology, will be more fully appreciated by reference to the following illustrative and non-limiting detailed description of example embodiments of the present disclosure, when taken in conjunction with the accompanying drawings, in which:

FIGS. 4A to 4C show schematically examples of accident similarity assessment modules according to some embodiments of the disclosed technology;

DETAILED DESCRIPTION

Figure 1:
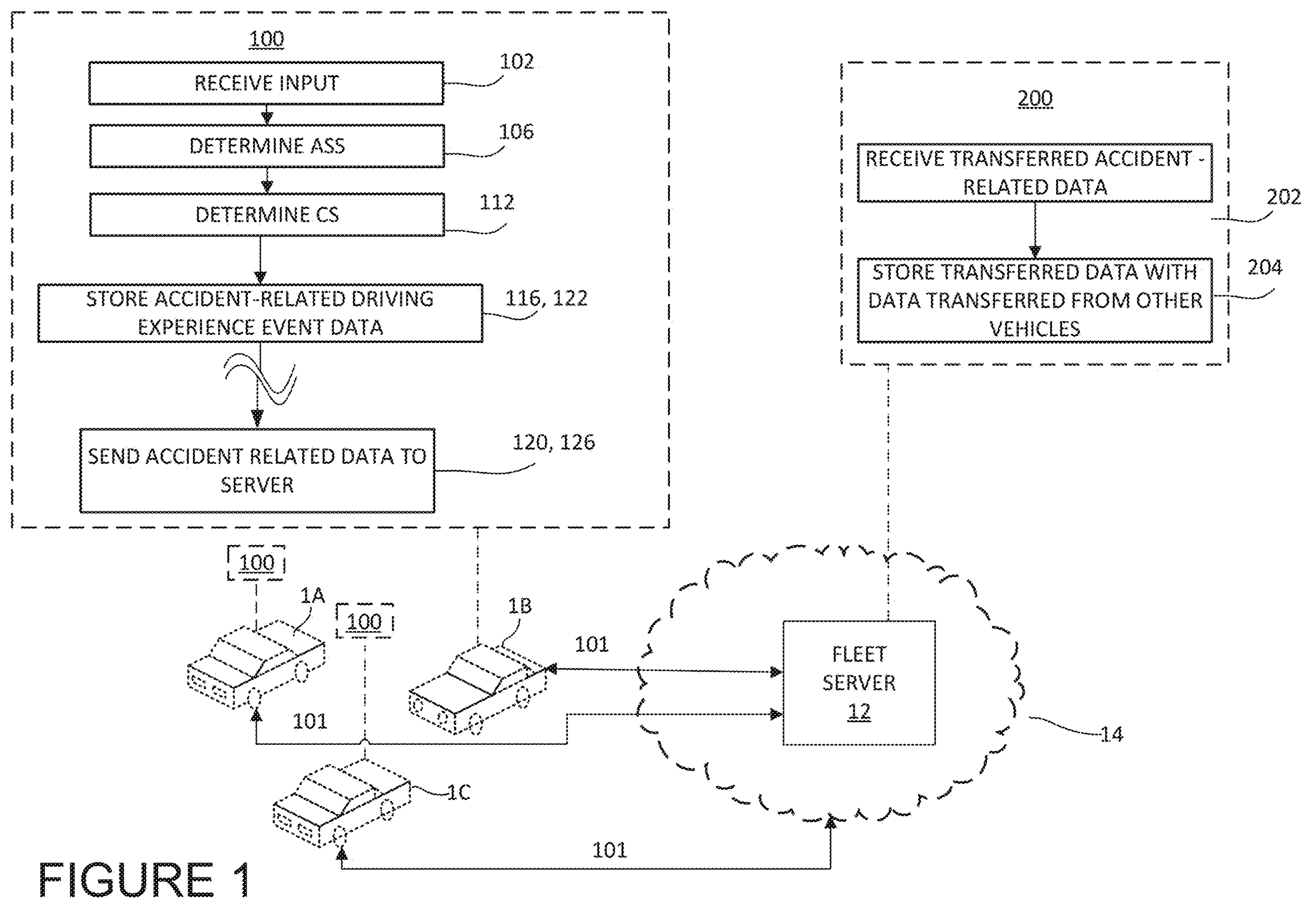
FIG. 1 shows a vehicle fleet server system according to some embodiments of the disclosed technology.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may refer to more than one unit in some contexts, and the like. Furthermore, the words “comprising”, “including”, “containing” do not exclude other elements or steps. It should be emphasized that the term “comprises/comprising” when used in this specification is taken to specify the presence of stated features, integers, steps, or components. It does not preclude the presence or addition of one or more other features, integers, steps, components, or groups thereof. The term “and/or” is to be interpreted as meaning “both” as well and each as an alternative.

Certain terms used in this specification are to be given the following interpretations in the description of the claims and drawings unless the context indicates otherwise. Additional examples to illustrate the scope of certain terms may also be provided in the detailed description.

An increasing number of modern vehicles have one or more advanced driver-assistance systems (ADAS) to increase vehicle safety and more generally road safety. Examples of ADAS include adaptive cruise control, ACC, collision avoidance system, forward collision warning, all of which are electronic systems installed in a vehicle with the aim of aiding a vehicle driver while they are driving the vehicle. To function as intended, an ADAS may rely on inputs from multiple data sources, for example, automotive imaging, LIDAR, radar, image processing, computer vision, and/or in-car networking. Currently, development is ongoing in both ADAS and also Autonomous Driving (AD) systems and there are a number of different technical areas within these fields.

Some examples of modern AD systems comprise complex combinations of various components forming one or more systems which perform perception, decision making, and operation of the vehicle using electronics and machinery instead of a human driver and which can also introduce automation into road traffic. Some examples of AD systems can handle a vehicle, drive it to its destination, and maintain an awareness of surroundings, and while the AD system has control over the vehicle, the human operator is able to leave all responsibilities to the AD system. An AD system commonly combines a variety of sensors to perceive the vehicle’s surroundings, such as e.g. radar, LIDAR, sonar, camera, navigation system e.g. GPS, odometer and/or inertial measurement units, IMUs, upon which advanced control systems may interpret sensory information to identify appropriate navigation paths, as well as obstacles and/or relevant signage.

The common term Automated Driving System, ADS, is used herein to refer to both an ADAS and to an AD system and corresponds to all possible levels of vehicle automation, such as, for example, the levels defined by the SAE J3016 levels (0-5) of driving automation.

Driving experience event data may comprise data representing an event or sequence of events (such may form a scenario) as defined in any of the current or future versions of the Safety of the Intended Functionality, SOTIF, standard documentation. For example, the term event is defined in SOTIF as an occurrence at a certain place and at a particular point in time. SOTIF also mentions that the temporal sequence of actions/events and scenes specify a scenario, and in SOTIF a scenario is defined as a description of the temporal development between several scenes in a sequence of scenes.

References to a driving experience event may refer to a single driving experience event, or to a sequence of driving experience events, such as a driving experience scenario, unless the context dictates otherwise. A driving experience event is detected by processing one or more data segments (which includes frames) from one or more data streams from any suitable sensor or perception system of a vehicle whilst the vehicle is being driven to determine features which are recognisable as event signatures. A driving experience event may include data from one or more data streams. Examples of driving experience event data include sensory information such as object-level behavioural data and associated environmental and situational data. Sensory information driving experience data is generated by sensors on a vehicle whilst it is being driven (by a human and/or autonomously).

A driving experience event may comprise one or more data segments from one or more data streams from any suitable sensor or perception system, for example, the ADS, of a vehicle whilst the vehicle is being driven. By processing such driving experience events using an accident similarity assessment, ASA, module and a criticality assessment, CA, module, features can be extracted and associated with event signatures for a driving experience event or driving scenario. A driving experience event with an accident similarity score which indicates a driving experience event is not similar to any historic types of accident or near-accidents may nonetheless have a criticality score which indicates the driving experience event is related to an accident or near accident, as the accident or near-accident may be a new (as in not previously recognised) type of accident or near accident. The driving may be done by a human, by a human assisted by an ADS, or be fully autonomous.

Accident-related driving experience event data refers to data representing a driving experience event which meet one or more conditions for being associated with an accident or a near-accident. A driving experience event may be associated with a known or new type of an accident or a known or new type of near accident. For example, the accident-related driving experience data may comprise a driving scenario that meets one or more conditions for either resembling a known type of accident scenario or known type of near-accident scenario or the accident related driving experience data may comprise a new type of accident scenario or a new type of near accident scenario which do not resemble any known types of accident or near accident scenarios.

By detecting accident-related driving experience events which may comprise any driving experience that resembles a known accident or near accident scenario or comprises a new accident or near-accident scenario, it is possible to capture how a vehicle behaves in a manner which resulted in a collision being avoided as well as when a collision occurs. In other words, more information can be obtained for situations where an accident occurs as well as when an accident is successfully avoided which improves the learning efficiency and effectiveness of any subsequent analysis.

Accident-related driving experience event data comprises data representing a driving experience event and may also in some embodiments include data indicating an accident similarity and/or criticality of the driving experience event. The data indicating a criticality and/or accident similarity of the driving experience event may comprise a criticality score and/or an accident similarity score of the driving experience event. The criticality score and accident similarity score are associated with the accident-related driving experience event in any suitable way, for example, the criticality score and accident similarity score may take the form of meta-data in the form of a value, label or tag for the driving experience event data. The accident-related driving experience event data may comprise one or more data segments or just features extracted from one or more data segment(s) which are determined to form an accident-related driving experience event along with the data indicating the criticality and/or accident similarity of the accident-related driving experience event.

An accident or near-accident comprises a driving experience event which results in a vehicle experiencing a collision or near-collision respectively with another object. In other words, a near accident is a driving experience event which exposes a vehicle to a safety critical situation (which is often very close to collision) but no collision happens. A near accident may be a near miss but a driving experience event which is measurably similar to an accident is not labelled a near accident if it is not safety critical (see below).

A known type of accident or known type of near accident refers herein to a previously detected, recognisable, type of accident-related driving experience event included in the training data for a machine-learning model. Examples of suitable accident and near-accident training data sets are well known to those of ordinary skill in the art and are available in public repositories such as, for example, in a naturalistic field operational test, NFOT data repository, as well as other types of data repositories, for example, those created by insurance and or policing purposes.

A new type of accident or new type of near accident refers herein to any type of accident-related driving experience event which is not recognised by a machine-learning model which has been trained using a data set comprising known types of accidents and/or known types of near accidents, and for which a criticality score meets a condition for the accident-related driving experience event to nonetheless be considered indicative of a collision or near collision. In other words, if the machine-learning model output of the ASA indicates its input data segment(s) were not sufficiently similar to any of the known accidents and/or known near accidents in its training data yet the criticality score of criticality features extracted from the input data segment indicates a collision or near-collision may have nonetheless occurred, the input data segment(s) may be determined to comprise a driving experience event which represents a new type of accident or a new type of near accident.

Accident-related driving experience events comprising known or new accident-related driving experience events may also be detected by processing input comprising one or more data segments separately or sequentially using an accident similarity assessment, ASA, module and a criticality assessment, CA, module. Some examples of ASA modules are shown in FIGS. 4A to 4C described later below.

The ASA module extracts features from input comprising one or more data segments for comparison with features of known accident-related driving experience events. Based on the feature comparison, a similarity metric or score is determined by the ASA module. The CA module extracts features from input comprising the same one or more data segments for which an accident similarity score has been determined. Any suitable technique for extracting features for determining the accident similarity and criticality scores may be used by the ASA and CA modules. Based on the criticality features derived from the features extracted from the input data, a criticality metric or score is determined by the CA module.

In some embodiments, each data segment input to the ASA module is processed to determine an accident similarity score and each data segment input into the CA module is processed to determine a criticality score. However, the criticality and accident similarity scores may be assigned instead to a group of more than one data segments in some embodiments depending on the duration of the accident-related driving experience event. In some embodiments, in other words, the accident similarity score and criticality score are determined for each input data segment, but the scores are assigned to a single accident-related driving experience event comprising a time-sequential series of input data segments.

Accident similarity is a measure of the degree of resemblance of data features of a driving experience event to corresponding data features of a known accident or near accident driving experience event. The accident similarity score comprises a measurable metric of accident similarity which may be determined using any suitable technique known to someone of ordinary skill in the art.

Criticality is a measure of threat or a measure of how safety critical a driving experience is. In some embodiments, the criticality is expressed as a time critical condition, TCC, value. A TCC value of 0.5 sec means that ego vehicle is only 0.5 seconds away from a critical condition such as a collision. The collision may not occur, but only if some action is taken to avoid the collision which occurs within less than 0.5 secs. It can be quite tricky for the driver or ADS to avoid collision and mitigate the risk of collision in such a short time-scale. Coming so close to a collision is also a stressful situation for the vehicle's occupants. The criticality score is not a measure of severity of a collision, rather it is a measure to estimate how safety critical a driving situation can become.

The criticality score of an accident-related driving experience may be determined using any suitable technique for measuring the criticality of an accident related driving experience event known to someone of ordinary skill in the art. In some of the disclosed embodiments, the criticality score is determined by detecting a set of criticality features represented by criticality parameters using any suitable technique known to someone of ordinary skill in the art, for example, by using a suitable technique known to anyone of ordinary skill in the art to extract features from the input data, by feeding the input into a CA module comprising a deterministic, probabilistic and/or statistical machine learning model configured to determine a criticality score based on criticality features or parameters which may comprise or be derived from features extracted from the input. For example, a set of features indicative of the proximity of nearby objects and the rate of approach to those objects may be used to determine a criticality parameter such as, for example, a TTC, and based on the TCC, a criticality score can be computed by the criticality score module.

In some of the disclosed embodiments, the criticality score is dependent on a set of one or more criticality parameters representing one or more of sensory information for the proximity of objects in the surrounding environment of the vehicle, object-level behavioural features, internal vehicle state features, external vehicle state features, one or more occupant states, and a driver state.

In some embodiments, the criticality score determines the criticality level or the threat level of a driving experience event that a vehicle encounters in a manner that represents how well the driving experience event was managed with respect to the vehicle occupants' safety.

In some embodiments, the criticality score is determined by a criticality assessment module using a rule-based model, however, in some embodiments a suitable machine learning model may be used instead or in addition. The models may process input data segments in a deterministic way, for example, by classifying the input data segment(s) as representing a critical or non-critical driving experience event or in a probabilistic way, for example, by providing a probability for a criticality of a driving experience event represented in the input data segment(s). For example, the CA module may compute a criticality score based on a set of parameters, for example, comprising one or more of the following: occupant/passenger stress level (obtained from driver state estimation module), closeness to external objects or barriers, lateral accelerations, longitudinal accelerations, used brake force, Time to Collision (TTC), Brake Threat Number (BTN), Steering Threat Number (STN), post encroachment time, PET and so forth. Any technique known to someone of ordinary skill in the art may be used to extract features directly or indirectly from the input data stream to determine the criticality score from the input data. Other examples of criticality parameters that can be used in determining the criticality score can also be defined which are known art and it is known to someone of ordinary skill in the art how these those metrics/parameters can be calculated, for example, U.S. Pat. No. 7,034,668 entitled "Threat Level Identification and Quantifying System" discloses various methods for performing threat assessments of objects for vehicles. Additional examples are also disclosed in the Masters Thesis "Multi-Target Threat Assessment for Autonomous Emergency Braking" by Andreas Andersson, published by Chalmers University of Technology, Gothenburg, Sweden, 2016, available from https://publications.lib.chalmers.se/records/fulltext/245725/245725.pdf of how the STN and BTN can be calculated.

Figure 2:
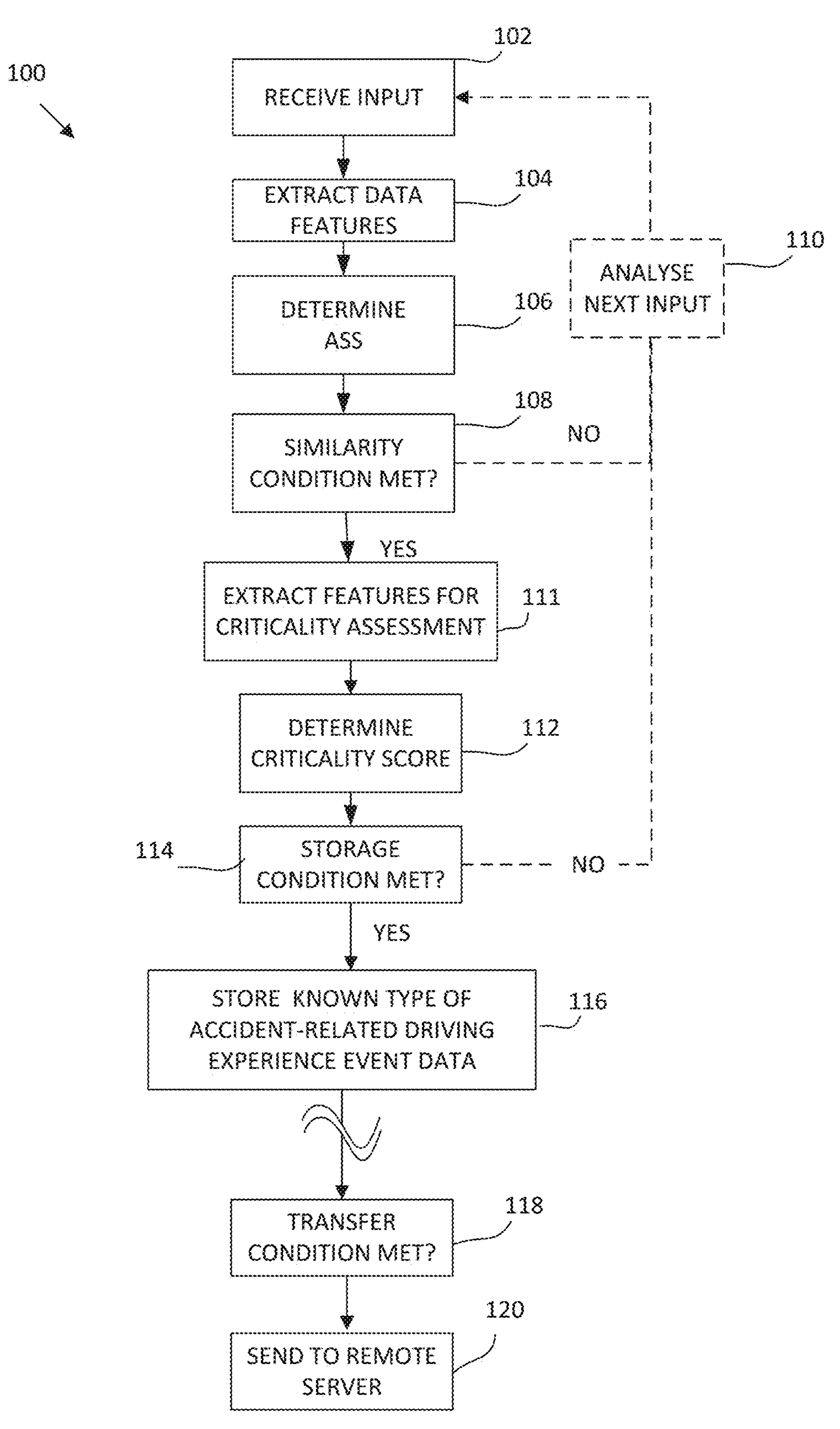
FIG. 2 shows a method for detecting and collecting accident-related driving experience event data according to some embodiments of the disclosed technology.
Figure 3:
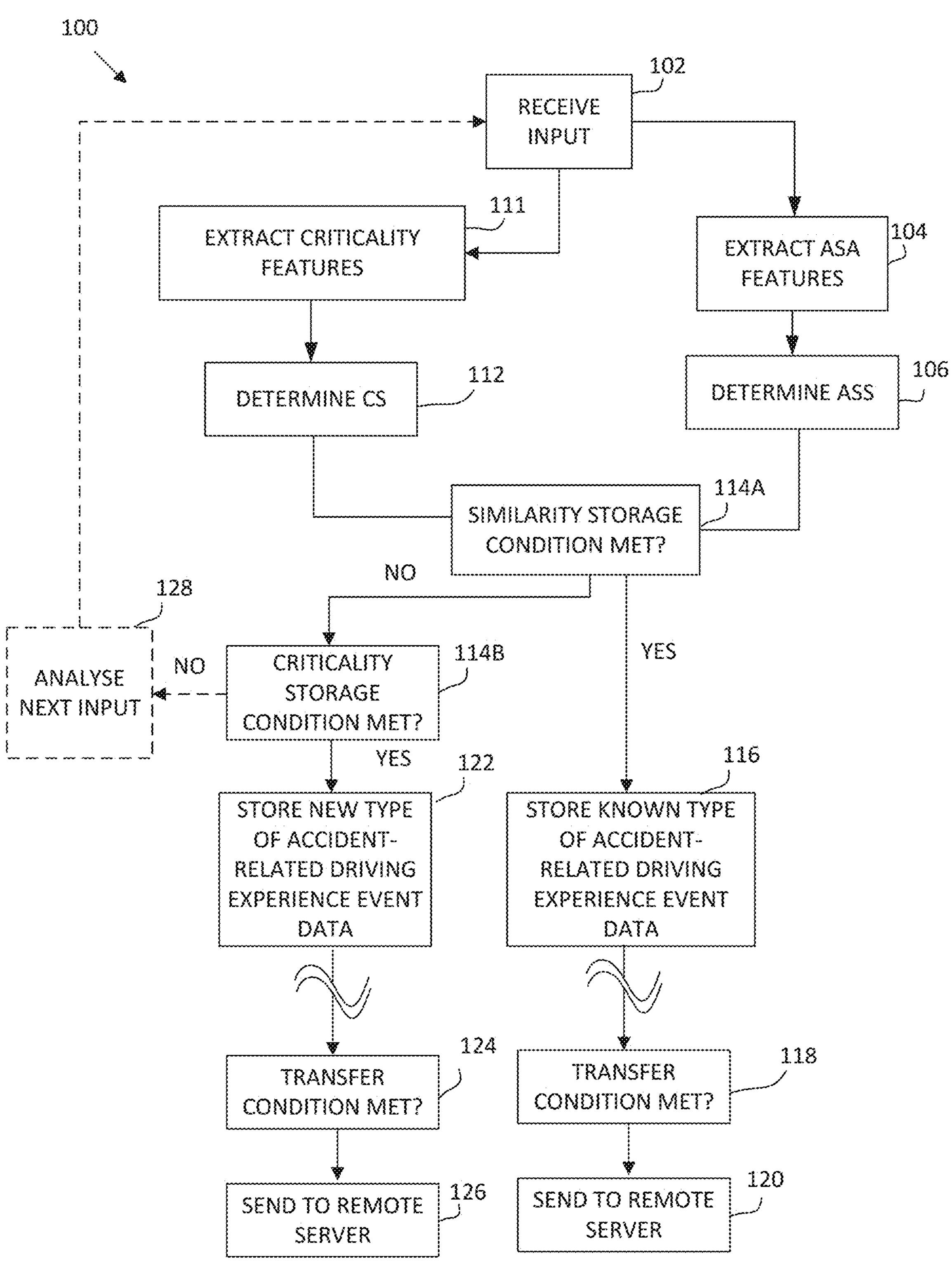
FIG. 3 shows another method for detecting and collecting accident-related driving experience event data according some embodiments of the disclosed technology.

In some embodiments, an accident-related driving experience event is detected in a data stream by being associated with a criticality score independently from any processing to associate the accident-related driving experience event with a similarity score. In other words, as shown later in FIG. 2 the criticality feature extraction to make the criticality assessment, CA, is performed as a result of the similarity condition being met. However, the extraction of criticality assessment features and determining the criticality score, CS, may be done independently (or in parallel) to extracting accident similarity assessment features and determining the accident similarity score, ASS, as is shown in FIG. 3. FIGS. 2 and 3 are described in more detail later below.

A storage triggering event triggers storage of accident-related driving experience event data.

A transfer triggering event triggers the transfer of stored accident-related driving experience event data to a remote server. The transfer triggering event may replace or comprise the storage triggering event in some embodiments. The same event may trigger temporary storage until a transfer is subsequently completed. The data may be retained or later deleted from the on vehicle storage.

Examples of a storage or transfer triggering event include completion of determination of an accident similarity score alone, the completion of the determination of both an accident similarity score and a criticality score, and the completion of the determination of a criticality score. For example, the accident similarity score of a driving experience event may be compared with a condition such as a threshold accident similarity score for a known type of accident or near accident driving experience event. If the accident similarity condition is met, for example, if a threshold accident similarity score is exceeded, then this may act as a storage triggering event, which causes the driving experience event, and in some embodiments, also the criticality score and accident similarity score, to be stored locally as an accident-related driving experience event data until a later transfer triggering event occurs. Alternatively, if the accident similarity condition is met this may, for example, or act directly as a transfer triggering event, in which case the driving experience event is transferred as soon as possible (either from the buffer or from storage).

If the accident similarity score condition is not met, but the criticality score meets a condition or threshold value for the driving experience event to comprise a new type of accident or near accident, this may also act as a storage or transfer triggering event. For example, the criticality score of a driving experience event may be compared with a condition such as a threshold value for criticality to indicate an accident or near accident (which may be of a known type or a new type). If the condition is met, for example, if a threshold score criticality is exceeded, then this may act as a storage triggering event which causes the driving experience event and criticality score and accident similarity score to be stored locally as accident-related driving experience event data until a later transfer triggering event occurs, or act directly as a transfer triggering event, in which case the accident-related driving experience event data is transferred as soon as possible (either from the buffer or from storage).

Other examples of transfer triggering events include a certain amount of accident-related driving experience event data being collected, a certain amount of time or number of accident-related driving experience event detections since the previous transfer event occurred, or a scheduled time for a transfer triggering event being reached. However, in some embodiments, several different events may be collected and stored on the vehicle until a separate transfer triggering event occurs. For example, a trigger event could comprise a certain number of different accident-related driving experience events being detected or a certain amount of data being stored, or a certain amount of time elapsing since the first or last stored event. An example of a data transfer triggering event includes the detection, in a data stream, of one or more driving experience events associated with a criticality score and/or accident similarity score indicating the detected driving experience event is at least one accident related-driving experience event. Any other suitable trigger may be used as mentioned above, however, for example, the volume of data collected may trigger a transfer, the time elapsed since the first or last accident-related driving experience event detected, or the trigger may be set to provide transfers at regular time intervals. The server 12 then stores 204 the received accident-related driving experience event data with accident-related driving experience event data from at least one other vehicle.

In this way, in some embodiments, accident-related driving experience event data collection is triggered by the criticality score meeting a data collection threshold condition or value alone whilst in some embodiments, data collection is triggered by the combination of the criticality score with the accident similarity score meeting independent data collection conditions or threshold values.

Examples of data features comprise features representing the surrounding environment of the vehicle as perceived by the on-board sensors of the vehicle. For example, detected cars, vulnerable road users, VRUs, road edges or barriers, etc. Other example features relate to vehicle state, which can be determined using metrics representing inertial measurement units, IMUs, lateral/longitudinal acceleration, brake force, steering angle, speed, etc. Other example features relate to driver or another vehicle occupant's state, such as, for example, their stress level, which can be supplied by a driver (or occupant) monitoring system or a driver state estimation module in the vehicle.

A data segment or sequence of data segments may comprise a buffer of data from one or more data feeds which may comprise data streams. Alternatively, a data segment may comprise a frame of data in some embodiments. Examples of data streams include behavioural data streams derived from one or more sensory systems on the vehicle, environmental data streams, and data streams from a driver and/or occupant monitoring system for a vehicle. A data stream may comprise one or more different data streams which are fused together. A fused data stream may be pre-processed by, for example, interpolating values between different data streams. Each input data segment may comprise sensor data, for example, object-level behavioural data and/or other data such as situational or environmental data which may or may not be fused into a single data stream before being fed as input into the ASA module to have its accident similarity score determined. In some embodiments, data from different data sources which is sampled at different frequencies may pre-processed, for example, to interpolate between values from differently sampled data streams, before the data is input into the accident similarity assessment module. In some embodiments, time-stamps for events in a plurality of different data feeds are associated and/or otherwise aligned with each other.

A buffer or a frame of data may be a buffer or frame of data from one or more sensory data streams of an ADS of a vehicle or from some other perception or sensory system on the vehicle. For example, ADS data stream(s) which fill the buffer for input into the ASA module 34 may comprise a single data stream from the perception system 3 of the vehicle 1 which includes processed data from a number of different data feed sources. Alternatively, the ASA module 34 input buffer may collect the data directly from different data sources including or instead of the ADS 10. References to an ADS on-board a vehicle should accordingly be considered to also refer instead or in addition to any other suitable sources of data on-board the vehicle containing features which may be associated with an accident-related driving experience event unless the context clearly dictates otherwise.

The sensory data may be pre-processed before it is collected into a buffer to form data segment(s). Alternatively, a plurality of buffers may be provided which separate out the data feeds to allow different types of data feed to be input into different input layers of the machine learning model. Examples of a data feed include an environmental data feed comprising at least data relating to weather conditions and/or road conditions, a situational data feed comprising, for example, geographic or other location related data to the data stream from which data segments are formed, a vehicle state data feed, an internal vehicle state data feed, and occupant data feed and/or a driver data feed.

In some embodiments, accordingly, a data segment comprises at least object-level behavioural sensory information data obtained by a perception system 3 of an ADS 10 of a vehicle 1 which is obtained by buffering one or more data feeds from the perception system, and may include other types of information obtained from environmental and/or situational data feeds. For example, the state of surrounding road users and objects such as their type, relative velocity, distance, size, orientation, free-space, etc., and situational information which may include semantic labelling of lanes, visual landmarks, map-based information relating to the neighbourhood of the vehicle including proximity information to certain classes of buildings or premises such as schools, hospitals, fire stations, police stations and the like, highway and urban information, vehicle to other object, V2X, and vehicle to vehicle, V2V, communications such as may relate to traffic or hazard information, ego vehicle data, and environmental data such as weather information, local time of day, road geometry, road condition and road friction.

A machine learning module comprises a body of computer code held in memory, which when executed, processes input data using a machine-learning model. Examples of machine-learning models for determining accident similarity score include an autoencoder model, or a regression model. The machine-learning models are implemented in some embodiments using publicly available suitable software development machine learning code elements, for example, such as those which are available in Python, Keras and TensorFlow or in any other suitable software development platform, in any manner known to be suitable to someone of ordinary skill in the art.

FIG. 1 shows a vehicle fleet server system according to some embodiments of the disclosed technology comprising a plurality of vehicles 1 shown as vehicles 1A, 1B, and 1C in FIG. 1. Each of the vehicles 1 is configured to perform a computer-implemented method 100 for detecting accident-related driving experience events and collecting accident-related driving experience event data on a vehicle 1 according to the first aspect or any of its embodiments.

In some embodiments, a computer-implemented method 100 is performed by each vehicle 1 in the fleet. The computer-implemented method 100 performs detecting and collecting accident-related driving experience event data on the vehicle 1. The method 100 comprises receiving 102 a driving experience data stream from a source on-board the vehicle 1, determining 106 an accident similarity score for a data segment of the driving experience data stream, wherein the accident similarity score is based a similarity measurement of data features extracted from the data segment 104 to data features of a historic accident or near-accident driving experience event, determining 112 a criticality score for the data segment, and storing 116, 122, in dependence on at least one of the determined accident similarity score and the determined criticality score, at least the extracted data features from the data segment as an accident-related driving experience event in association with at least the determined criticality score.

Some embodiments of the method are performed on board the vehicle. For example, a control system 5 or an ADS 10 of the vehicle 1 which receives 102 the driving experience data stream from a source on-board the vehicle 1 may perform the method 100. The storing 116, 122, may store at least the extracted data features used to determine the accident similarity score or criticality score as an accident-related driving experience event based on the accident similarity score meeting a similarity accident score condition or based on the criticality score meeting a criticality score condition. The conditions are determined so that only a driving experience event which has a high probability of being an accident-related driving experience event is stored on the vehicle for subsequent transfer to a remote server, such as server 12 in FIG. 1. In some embodiments, the storing 116, 122 stores the data segment including the extracted data features as an accident-related driving experience event based on the determined criticality score of the data segment meeting a criticality score condition and/or based on the determined accident similarity score of the data segment meeting a accident similarity score condition. In some embodiments, responsive to a triggering event, method 100 further comprises sending 120, 126 data comprising at least one stored accident-related driving experience event to a remote server 12. Some examples of triggering events were described above.

FIGS. 2 and 3, described later below, show example embodiments of method 100 in which at least the data features extracted from a data segment to determine the similarity score and/or the criticality score are stored 116, 122 but the entire data segment input may be stored 116, 122 instead.

The stored accident and/or near accident driving experience event data can then be subsequently analysed either on, but preferably off the vehicle 1 at a remote server 12 configured to collect similar data from other vehicles. The data may be transferred 118 to the remote server responsive to a triggering event.

The triggering event for sending 118 the stored accident-related driving experience event data to a remote server 12 may be different for each one of the vehicles shown as 1A, 1B, 1C in FIG. 1 or be the same. For example, the event which triggers sending 118 the stored accident-related driving experience event data to a remote server 12, shown as fleet server 12 over suitable communication links 101 may be the same event that triggers storing any accident-related driving experience event data or a different event.

Each communication link 101 shown in FIG. 1 is a wireless data connection over a cellular or other radio access network 14 and/or a shorter-range network to a suitable access point. However, in some embodiments, a communication link 101 could be a wired data connection if a suitable data output port of a vehicle 1 was connectable to a wired data connection allowing the data is transferred in this manner. For example, if a vehicle 1 comprises an electric vehicle may be configured to transfer the data whenever it is docked for charging in this manner.

The server 12 shown in FIG. 1 collects accident-related driving experience event data from a plurality of vehicles. In some embodiments, the server 12 comprises a memory, a control circuitry comprising one or more processors or processing circuitry, and computer code stored in the memory which, when loaded from the memory and executed by the one or more processors or processing circuitry of the control circuitry or controller, causes the server 12 to receive 202 data comprising at least one accident-related driving experience event from a vehicle 1. For example, the data may be sent responsive to a data transfer triggering event occurring on one of the plurality of vehicles 1.

In some embodiments, each accident-related driving experience event transferred from a vehicle 1 and received by the server 12 comprises the entire data segment which was associated on that vehicle 1 with a criticality score. In some embodiments, each received accident-related driving experience event comprises a data segment associated with at least a similarity score and an accident criticality score which met the respective accident similarity and criticality storage conditions. In some embodiments, however, instead of the entire data segment being transferred, just the features extracted from an input data segment which were determined to form an accident-related driving experience event based on their accident similarity score and criticality score are transferred. The associated accident similarity score and the criticality score are transferred with the extracted data features in addition, for example, as metadata, in some embodiments, but may not be transferred in other embodiments.

The accident similarity score and criticality score may be associated with the transferred accident-related driving experience events in any suitable manner, for example, as meta-data or tags, or, for example, provided as labels for the associated transferred event data.

The source on-board the vehicle 1 of the driving experience data stream is an on-board ADS 10 in some embodiments which inputs one or more driving experience event data streams into the ASA and CA modules. The input may comprise situational, environmental and behavioral object-level sensory information data feeds which may be fused into a single feed in some embodiments. Examples of data features which may be extracted from the data segments forming the input to the ASA and CA modules include: driver state features, occupant state features, behavioural features, including vehicle state and other objects, environmental features; and situational features.

By enabling a remote server to receive accident-related driving experience event data from a fleet of vehicles, each of which performs a method 100 to collect accident-related driving experience event data in a consistent manner, a suitable body of such accident-related experience data can be built up at the server in a more efficient manner without requiring huge amounts of potentially irrelevant data to be transferred to the fleet server 12.

The transferred accident-related driving experience event data may be used for a variety of purposes. For example, the accident-related experience data can be used to tune the parameters of a vehicle ADS for safe planning. In some embodiments, to facilitate subsequent analysis each accident-related driving experience event is labelled for imitation learning and/or reinforcement learning either on the vehicle 1 or at the server 12.

The data collected by the fleet of vehicles comprises accident-related driving experience events which include both events similar to historic accident or historic near-accident driving experience events as well as possible new accident experiences or near-accident driving experience events. This not only allows a useful amount of data for subsequent analysis to be gathered more quickly but also less network resources are used as method 100 reduces the amount of data that might otherwise need to be transferred to ensure data is collected even when an accident is avoided. In other words, the method 100 enables data to be detected and collected which relates to when a vehicle successfully avoided an accident as well as when an accident happens. Analysis of accident-related (i.e. accident and near accident) driving experience events collected using method 100 by the vehicles 1 in the fleet managed by the server 12 thus enables ADS features such as precautionary safety algorithms to be developed more quickly to, for example, adjust a vehicle's path to increase its safety and potentially increase the speed at which a probability of an accident is detected in real-time.

The transferred data may also be subsequently used for shadow mode testing of new software in critical situations to compare the performance of the new software with human driver actions. The accident similarity score for driving experience event data in various situations can then be used as a key performance indicator, KPI, for activations of shadow mode testing.

Another use of the collected accident-related driving experience event data includes forming new training data for the on-board machine learning model of the machine learning module 16 incorporated in the accident similarity assessment module 34 described in more detail below. If a machine-learning model is locally updated on a vehicle, the updated machine-learning algorithm and/or any other data such as weights etc, may be transferred separately to the remote server 12 which allows a global machine learning model for the fleet of vehicles 1 to be similarly updated for consistency. After updating the central or global machine learning model the server 12 can provide updates to the other vehicles in the fleet (shown as vehicles 1A, 1B, 1C in FIG. 1) so that their accident similarity assessment module 16 are each able to use a copy of the updated global or central model in some embodiments.

FIG. 2 shows a more detailed embodiment of the method 100 according to the first aspect of the disclosed technology performed by a vehicle 1. In the embodiment illustrated in FIG. 2, the method 100 comprises receiving 102 an input data segment or segments, extracting data features 104, determining 106 the accident similarity score of the data segment, for example, by inputting the data segment into an accident similarity assessment module 34 comprising a machine learning model 16 trained to extract features from the input data segment using historic accident or historic near-accident driving experience event data as described later below, extracting data features 104 from the data segment using the accident similarity assessment module 34, and determining 106 the accident similarity score for the data segment based on a measurement of the similarity of the extracted features with historic accident and historic near-accident driving experience event features, a check 108 is then made based on whether a similarity condition has been met, and if the extracted features are not found to be sufficiently similar, i.e., if the check is failed, then the next input is received 102 and the previous input may be discarded. If the check is passed, then the method continues by determining 111 criticality features which are also extracted from the data input in 102. If the accident similarity score and criticality score meet one or more conditions for storing 116 and/or transferring 120 that data segment as an accident-related driving experience event in step 114 then the data is stored in step 116. If not, the next input is analysed in step 110 and the previous input may be discarded. In some embodiments, it may be more computationally efficient to perform the feature extraction for both the accident similarity score and the criticality score in a single processing step even if the set of features used to determine the accident similarity score includes different features from the set of features used to determine the criticality score. In some embodiments, any input data determined to comprise one or more accident-related driving experience events is collected on the vehicle and stored 116 until a transfer condition is met 118 which then triggers the collected accident-related driving experience event data being sent 120 to a remote sever.

The embodiment of method 100 shown in FIG. 2 determines the accident similarity score for a data segment before determining the criticality score. This could prevent some data segments from being processed to determine their criticality score, as if the data features extracted from a data segment are not sufficiently similar to the recognised data features of a historic accident, the data segment is discarded and/or not further processed for criticality assessment. Whilst this embodiment of method 100 may free up the resources on-board the vehicle which might otherwise be used to store the data and/or process it to determine a criticality score, however, it also means new types of accident driving experience events would not be detected if the driving experience event is not sufficiently similar to a historic accident or near-accident. Accordingly, in some embodiments, the method 100 also comprises if the determined accident similarity score does not meet a threshold score condition for the data segment to resemble a historic accident or a near-accident driving experience event, determining, based on the criticality score meeting a threshold criticality score condition, the data segment comprises a different type of accident or near accident driving experience event to the historic accident or near-accident events.

FIG. 3 shows a second example embodiment of method 100 for detecting accident-related driving experience event data according to some embodiments of the disclosed technology which in addition to recognising if a driving experience event resembles a historic accident or near accident driving experience event also supports determining if a driving experience event is a new type of accident event or near accident event. To achieve this, the embodiment of method 100 shown in FIG. 3 does not immediately discard data segments on the basis their accident similarity score does not meet a condition for the driving experience event to resemble a historic accident or near accident driving experience event.

As shown in FIG. 3, the method 100 comprises receiving 102 input and processing the input to determine a criticality score independently of the processing performed to determine a similarity score. This example embodiment of method 100 comprises receiving input 102 and then extracting 111 criticality features for determining 112 a criticality score, CS, as well as extracting 104 accident similarity features for determining 106 an accident similarity score, ASS. This may be achieved by, for example, providing a copy of the input to a criticality assessment module 23 as well as providing the input also to a ASA module 34 either in parallel, or sequentially.

As shown in FIG. 3, method 100 then determines 114A, based on whether one or more similarity conditions are met, if the input data and/or the extracted data features should be stored 116 for transfer to a remote server such as server 12 in FIG. 1, and if not, determines 114B if the criticality score is nonetheless sufficient to meet one or more criticality storage conditions for storing the input as a new or hitherto unrecognised type of accident-related driving experience event. If neither conditions are met then the method moves on to analyse 128 the next input. It may also be possible, in some embodiments, for the criticality storage conditions to be checked 114B before the similarity conditions are checked 114A (not shown in FIG. 3). It is also possible for these to be checked in parallel if the criticality score and accident similarity score are each available.

If the similarity storage condition(s) are met in 114A, then the input data segment is stored (116) on the basis of being similar to a known-type of accident-related driving experience event for subsequent transfer 120 to the remote server as soon as any transfer condition is determined 118 to have been met. If the criticality score-based storage condition(s) are found to be met in 114B, then the input is also stored 122 however its storage is based on the input comprising a new type of accident-related driving experience event for subsequent transfer 126 to the remote server 12 as soon as any transfer condition for new types of accident-related driving experience event data is determined to be met 124. In some embodiments, the transfer conditions for both new and known types of accident-related driving experience events to the remote server are the same, so that steps 118 and 124 are the same, as are steps 120 and 126. In some embodiments, however different transfer conditions may be used however, in which case, steps 118 and 124 and 120 and 126 may not occur at the same time.

In this way, in some embodiments, based on the determined accident similarity score not meeting a threshold score condition for the data segment to resemble a historic accident or a near-accident driving experience event or being above a threshold value different from the threshold value for the data segment to resemble a historic accident or a near-accident driving experience event, the method 100 further comprises: determining 114B, based on the criticality score meeting a threshold criticality score condition, the data segment comprises a different type of accident or near accident driving experience event, for example, a different type of accident or near accident driving experience event to any of the historic accident or near-accident events used to train the machine learning model. The accident similarity assessment may be any suitable measurable assessment which indicates the proximity of a set of one or more features of each data segment to features which a machine learning model has been trained to associate with a historic accident or near accident. In some embodiments, the criticality score and/or accident similarity score of each data segment comprising an accident-related driving experience event (which may be a historic accident, a historic near-accident, or a new accident or new near-accident) is transferred to the remote server 12 with the data segment. This enables the threshold criticality score, for example, used to identify a new type of accident driving experience event to be evaluated by the server and so this can be adjusted by the remote server 12 in a manner which can be consistent for all vehicles in the fleet. New types of accident-related driving experience events transferred to the server can then be used to update the training data sets and/or the algorithms used by the accident similarity machine learning algorithms at the remote server 12 which can then update the accident similarity machine learning algorithms used by each vehicle in the fleet.

In some embodiments the accident similarity score and a criticality score for an accident-related driving experience event are used to label that accident-related driving experience event data for subsequent analysis, for example, to facilitate its use by another machine learning technique such as an imitation or reinforcement learning algorithm.

For more detailed information about how the collected data can be used in an imitation learning framework, see Reinforcement Learning based Control of Imitative Policies for Near-Accident Driving, by Cao et al, published on 1 Jul. 2020, available to download from: https://arxiv.org/pdf/2007.00178v1.pdf, and the code available from: https://github.com/Stanford-ILIAD/CARLO.

In some embodiments the method 100 further comprises assigning an accident-related driving experience event data to an imitation learning demonstration class, in which case the method may further comprises including as meta data, or by using some other indicator, the imitation learning demonstration class the data segment has been assigned to facilitate processing by the server 12.

The accident similarity and criticality scores are used to identify relevant accident-related driving experience event data for transferring to the server for subsequent analysis. In some embodiments, the scores are also used to collect accident-related driving experience event data into one or more groups or data collections on the vehicle which may be transferred together or separately. Each stored accident-related driving experience event may be transferred with its accident similarity and/or criticality scores or without them. The scores may be recalculated by the server receiving the transferred data in some embodiments.

In some embodiments, each data segment input into the ASA module 34 comprises a buffer full (or some other capacity level of the buffer) of an ADS data feed or feeds, although other source(s) of data may be used in addition or instead in some embodiments. In some embodiments, instead of being based on the input buffer capacity, the data segments input to the ASA module 34 comprise frames of data from the vehicle's perception system 3.

In some embodiments, the amount of data which can be input at any time into the ASA module represents a shorter time period than it takes for an accident or near-accident to occur, meaning that the time period of some accident-related driving experience events in the training data may be longer than the input data segments. An accident similarity score and/or a criticality score for a data segment of the data stream may then comprise determining an accident similarity score and/or a criticality score for each individual one of a plurality of time-sequential data segments and/or be determined collectively for a plurality of time-sequential data segments. An accident similarity score for a plurality of data segments can be determined using a suitable machine learning model which takes temporal aspects of the data into account based on a history of features is used. For example, a recurrent neural network based ML model may be used which is trained on historic accident or near accident experience event data in which the input data comprising scenario data collected over a longer period of time than the time associated with just one data segment. In this case, a sequence or series of time-sequential data segments or data features extracted from the sequence of data segments based on their similarity to historic accident or near-accident data features may form an accident-related driving experience event or scenario to which the accident similarity and criticality scores are assigned.

In some embodiments, if each data segment in a series has an accident similarity score and/or a criticality score over a threshold score for a certain period of time or number of data segments, then the series of data segments (or the extracted accident experience features extracted from the series of data segments) can be collectively or individually stored as accident-related driving experience event data. In some embodiments, the sequence or series of data segments may not always have strictly consecutive timestamps. The accident similarity and/or criticality scores of a plurality of data segments may be tracked over a period of time and statistically over a period of time and if a certain number of the plurality of data segments have accident similarity and/or criticality scores which meet the conditions for being accident-related driving experience event data then the plurality of data segments may still be logged collectively as accident-related driving experience event data even if some of the data segments in that period do not individually meet the conditions for that data segment to be considered an accident-related driving experience event or part of an accident-related driving experience event.

Figures 9A, 9B, 9C:
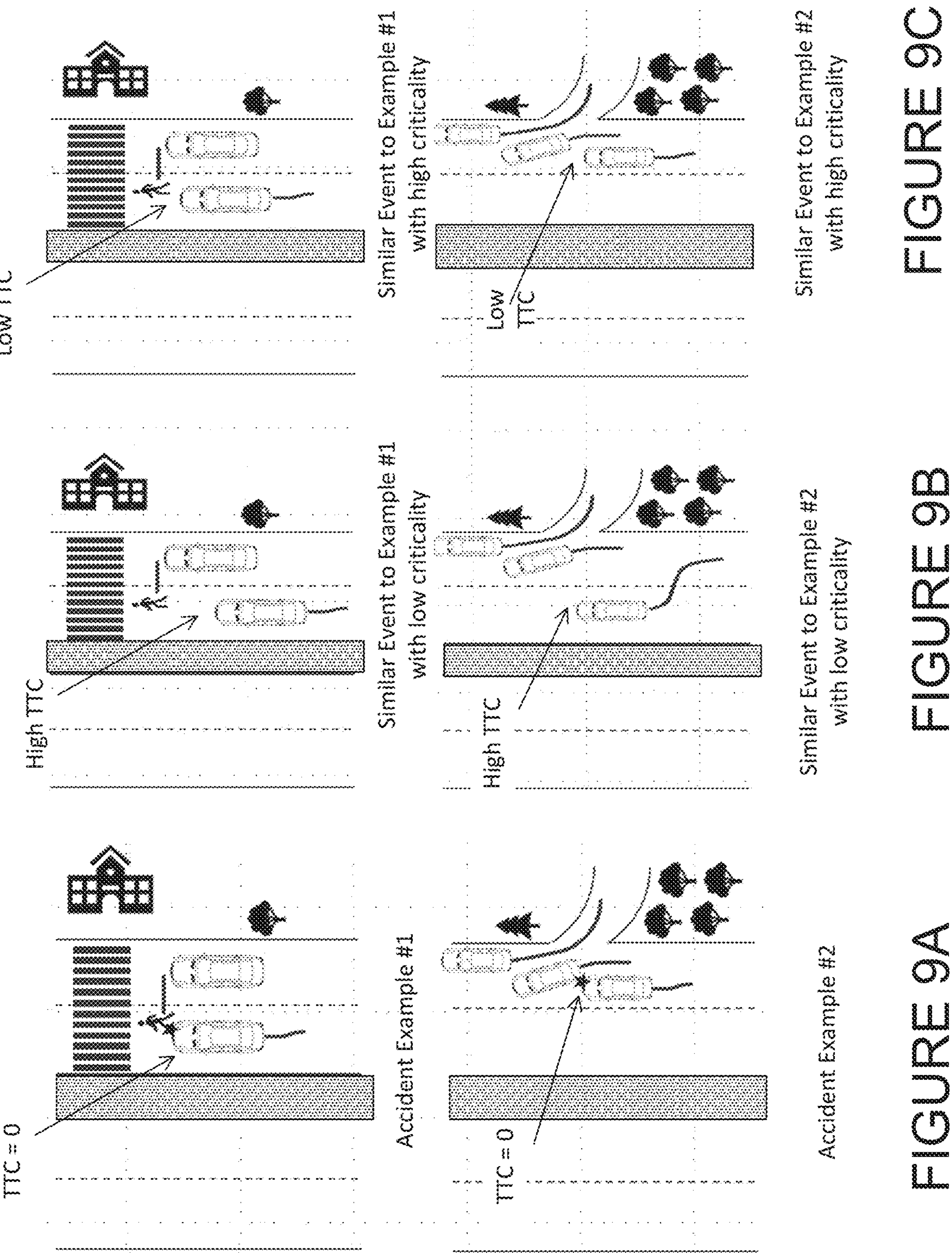
FIG. 9A shows two examples of typical accident experience events a vehicle can encounter.
FIG. 9B shows two examples of driving experience events similar to those shown in FIG. 9A with low criticality.
FIG. 9C shows two examples of driving experience events similar to those shown in FIG. 9A with high criticality.

In some embodiments, accident-related driving experience events are labelled based on their criticality scores as perfect (safe) or imperfect (safety critical) demonstrations for imitation learning processes which are performed after they are transferred at the server 12. Both types demonstrations are useful. FIGS. 9A, 9B, and 9C described in more detail later on provide some illustrative examples which exemplify high and low criticality scores, in which high criticality score means a highly critical situation where the criticality score comprises a TTC based criticality score. A criticality score however may be based on one or more different criticality features such as, for example, a brake threat number threshold value or any of the examples given previously above.

If, for example, the criticality score is based on a TTC metric, a perfect demonstration comprises an accident-related driving experience event in which the criticality score reaches zero (implying there is no collision or accident and TTC is high enough), whereas an imperfect demonstration could comprise a near-accident accident-related driving experience event where there is no collision eventually but the minimum TTC is larger than a threshold (for example, if the TCC does not reach zero). A perfect demonstration for an imitation learning algorithm means that the demonstration is perfectly a safe driving manoeuvre (a perfect illustration showing how to drive in that situation), which ADS can use to learn from it. In other words, the perfect demonstration shows a driving experience example which had high ASS, but the driver could perfectly and safely handle it since the criticality score was low, so we can learn from what driver did to train algorithms to do the same in similar situations. An imperfect demonstration on the other hand means that it was not the best possible action in a situation with high ASS, but maybe not so bad that a collision occurred. Such example demonstrations nonetheless include information that can be useful, for example, for training path planning algorithms.

FIG. 4A to 4C show different examples of an accident similarity module, ASA, 34 which may be used to determine an accident similarity score for any inputted data segment(s). FIG. 4A shows schematically a general example of an accident similarity assessment module 34 comprising a machine learning, ML, module 16 which contains a suitably trained ML model, of which may suitable examples are known to those of ordinary skill in the art. For example, in some embodiments, the machine learning model 16 may comprise one or more of the following: a recurrent neural network, a long-short-term memory neural network; a convolutional neural network; an autoencoder; a sparse autoencoder, a variational autoencoder, and a support vector machine, SVM.

The training data set used comprises accident-related driving experience events, such as accident-related driving experience scenarios which have been previously recognized and collected into one or more accident or near accident databases or data repositories such as those mentioned previously above. Once the ML model of the ML module 16 has been trained, it is used to extract features from input data 15 to determine if the input 15 includes similar features to its training data. The extent to which the features found using the ML model resemble features of previously detected accident-related driving experience event data can be measured using any suitable technique known in the art and the result may be expressed in the form of a similarity score or similarity metric.

Figure 6:
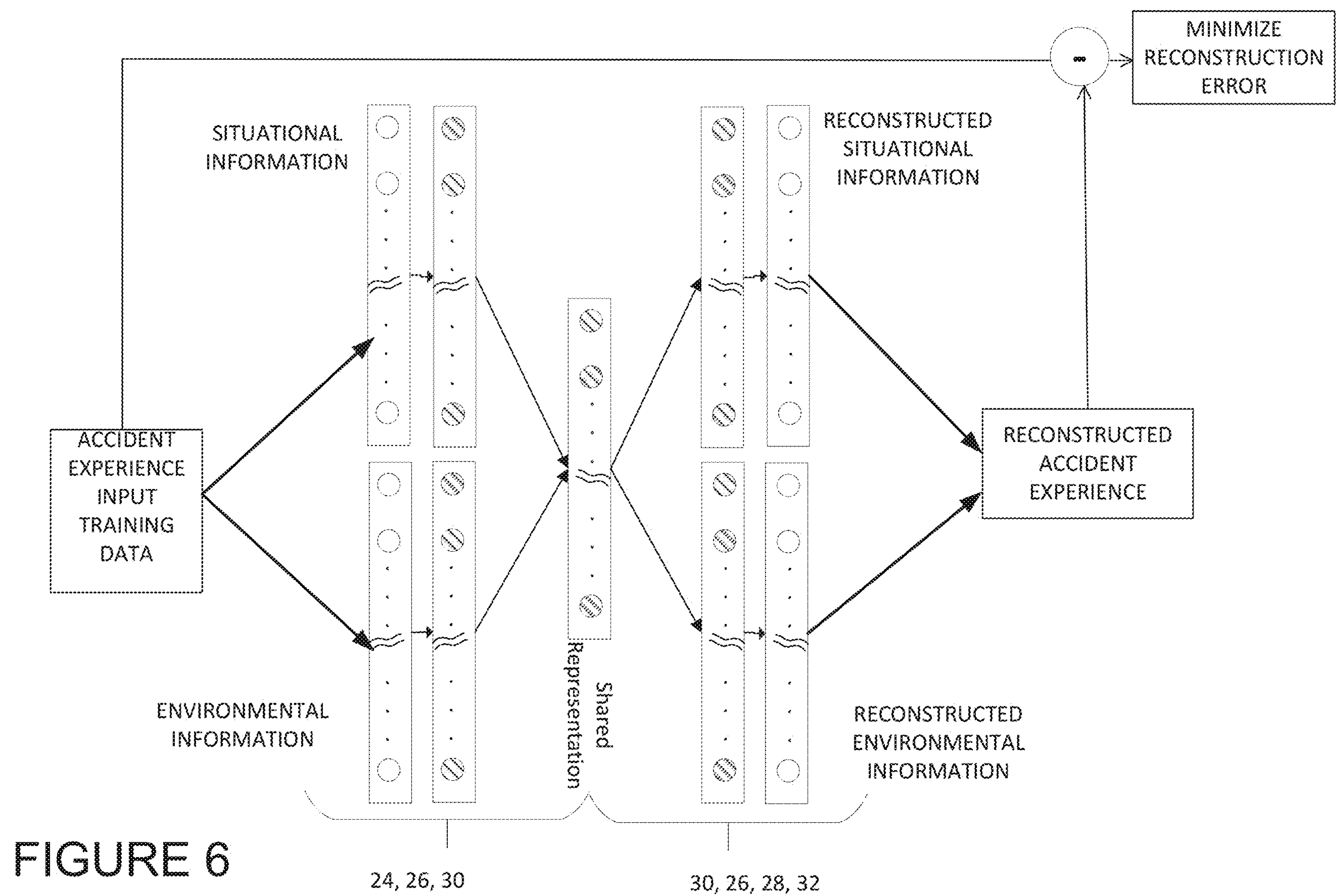
FIG. 6 shows in more detail an example of how an autoencoder machine learning model may be trained to determine accident similarity according to some embodiments of the disclosed technology.

Each data segment provided as input 15 to the ASA module 34 is fed into an input layer 24 of the machine learning model of ML module 16. The feature values of the input vector representing the input data segment may be processed based on the type of features they represent in the input data. For example, certain nodes in the input layer 24 may receive features associated with sensory data, some nodes features associated with behavioral data, and some nodes may receive situational data features. FIG. 6, described in more detail later below, shows an example of an autoencoder where the input data is processed in this manner.

The input is then processed by one or more hidden layers 26 including one or more layers 30 which adjust the dimensionality of their input data. The input is accordingly encoded, and the output of the encoded layer(s) is eventually decoded using at least one output layer 28. The machine learning model output 32 comprises features extracted from the input data which are then processed by the ASA module 34 to determine an accident similarity score which forms ASS output 36.

The ML model 16 of the ASA modules 34 shown in FIGS. 4A, 4B, and 4C is trained using historic, as in previously recognised or known, accident and near accident driving experience event data to configure the ML model to output 32 features of the input data which resemble features of the training data as much as possible. The training data may comprise data extracted from reported accidents and/or data from a naturalistic field operational test, NFOT data set.

FIG. 4B shows schematically an example where the ML module 16 comprises an autoencoder model. Many suitable examples of algorithms and rules for adjusting weights and any biases of autoencoder models for this context of use, for example, those known to detect rare or anomalous events, can be easily adapted by anyone of ordinary skill in the art. Such autoencoder models are available in a number of different formats such as, for example, TensorFlow, Python etc. The autoencoder 16 is trained exclusively using one or more known historic, as in previously detected and recognised, accident datasets, for example, it may be trained using a dataset comprising both accident data and near-accident data.

Each data segment of the ADS data stream which is provided as input 15 into the autoencoder 16 is first encoded using the model layers 24, 26, 30 and then decoded, for example, using one or more hidden layer(s) 26, 30 and output layer 28 to output 32 a set of features extracted from the input data segment. The autoencoder output 32 is then processed using a post-processing module 35 of the ASA module 34 which compares the input data segment 15 with the reconstructed output 32 of the autoencoder 16 to generate an accident similarity score which indicates how much the output 32 resembles the input data segment. The accident similarity score forms output 36 which may then be compared with a set of one or more conditions or threshold values to determine if the input data segment 15 should be stored as accident-related driving experience event data. If the accident similarity score is determined to be sufficient, this triggers the input 15 being stored in some embodiments (as shown in FIG. 2) however, in some embodiments, the input 15 is stored instead based on the criticality score for that input meeting a storage condition (as shown in FIG. 3).

The accident similarity score output 36 from the ASA module 34 for the input data segment is accordingly based on or comprises the reconstruction error in some embodiments. For example, a low-reconstruction error is represented by output 36 comprising a high accident similarity score, a high reconstruction error is represented by output 36 comprising a low output accident similarity score in some embodiments of the accident similarity score assessment module 34. However, the accident similarity score may be determined in a variety of ways known to those of ordinary skill in the art and the values may be inverted so that a high error is represented by a high-value metric in some embodiments.

A high-level example of suitable pseudo code to implement an autoencoder as shown in FIG. 4B may comprise the following functional code elements when executed:

i. buffer data (or capture frame);
ii. extract behavioural, environmental or situational features;
iii. input the extracted features into the trained autoencoder;
iv. reconstruct the input;
v. calculate the reconstruction error, and
vi. calculate the accident similarity as a function of the reconstruction error.

Many other examples of pseudo code are known in the art, some of which may be executed to provide different sequences of functional elements.

FIG. 4C shows schematically an example of an accident similarity assessment model 34 which comprises a regression-based machine learning module 16 for detecting and/or identifying accident-related driving experience event data according to some embodiments of the disclosed technology. In FIG. 4C, the regression-based ML module comprises an encoder 24, 26, 30 (for example, an encoder with a similar structure to the encoder part 24, 26, 30 of the autoencoder 16 shown in FIG. 4B) or some other dimensionality reduction method to extract important features of the input, for example, using principle component analysis. The output 32 of the encoder is fed into a one-class classifier 40. Examples of suitable one-class classifier ML models include a one-class support vector machine or SVM which extracts a set of features which are used to classify the features extracted from the input data segment as being features associated with a historic accident or a historic near-accident driving experience event (or not). In some embodiments, the type of historic accident or near-accident driving experience event may be determined using the classifier if this is configured to provide more than one classification class in its output. The output of the one-class classifier shown in FIG. 4C is then processed by the ASA module 34 to determine and output 36 an accident similarity score for the input data segment.

Figure 5:
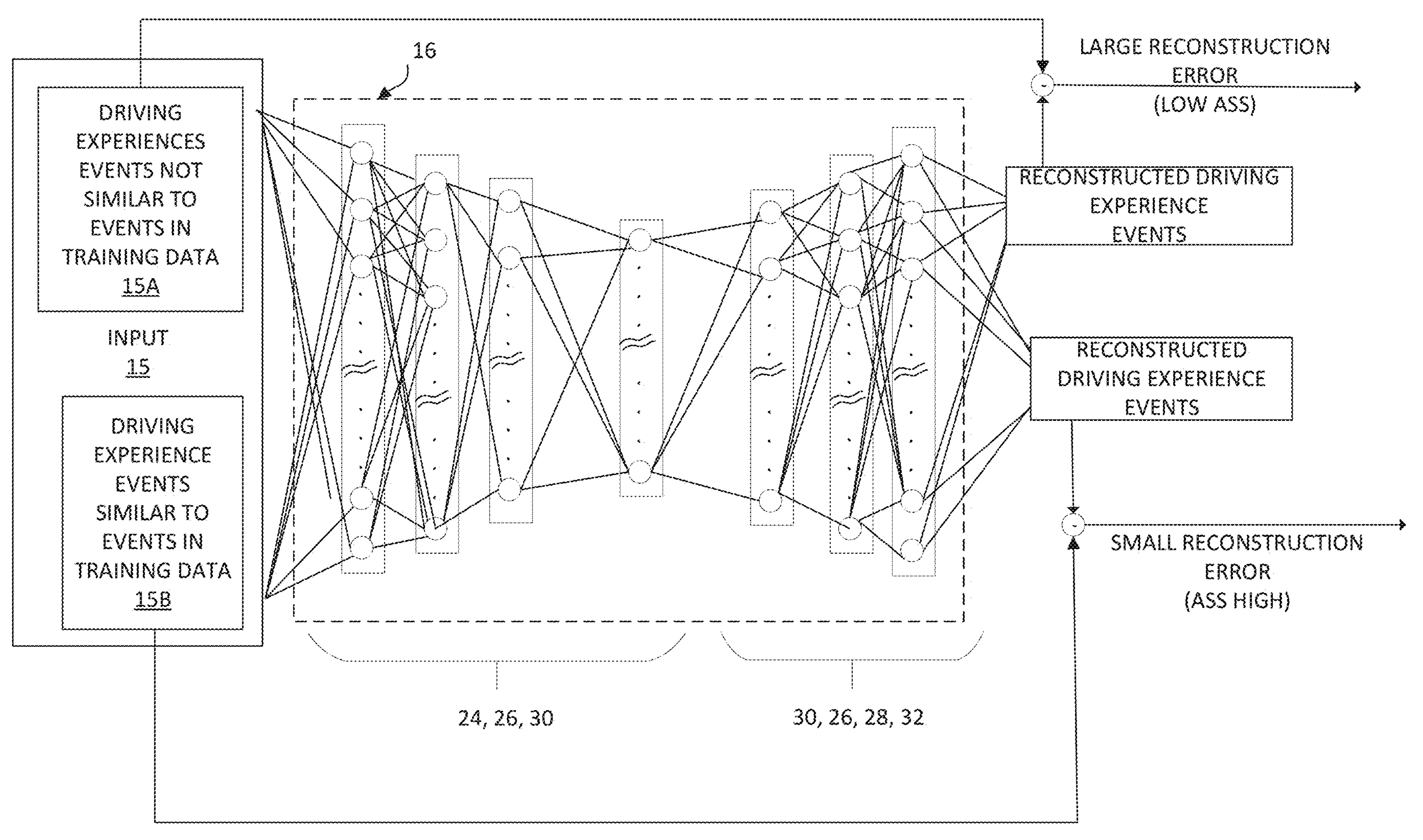
FIG. 5 shows in more detail an example of an autoencoder machine learning model of an accident similarity assessment module according to some embodiments of the disclosed technology.

FIG. 5 shows in more detail how an autoencoder machine learning model which is fed input 15B similar to its training data and input 15A which is not similar to its training data can be used to generate an accident similarity score according to some embodiments of the disclosed technology.

When the autoencoder output 32 is compared to the input 15, a large reconstruction error occurs if that input comprise input 15A whereas a low reconstruction error occurs if the input comprises input 15B (meaning the input data resembles accident-related driving experience event data). The reconstruction error is used to generate an accident similarity score for the input accordingly, in which the value of the accident similarity score can be used to determine if the input should be stored as it resembles a known type of accident-related driving experience event for subsequent transfer to the remote server 12 or not, in which case it may be discarded or a check made to see if its criticality score is sufficiently high for the input to be stored as a new type of accident-related driving experience event. High reconstruction errors correspond to the input 15A on which basis a low accident similarity score is assigned to the input 15B. If, the reconstruction error is low, it means the input data segment 15 contains features which are similar to features of historic accident and historic near-accident driving experience events which were included in the training data for the autoencoder. The ASA module 34 then outputs a high accident similarity score for that input data segment. The degree of similarity between the input and output can be determined based on any technique for calculating a reconstruction error known to someone of ordinary skill in the art.

FIG. 6 shows an example of an autoencoder in which different types of features are differently processed within the input and encoding layer(s) of the autoencoder model. For example, in FIG. 6, the autoencoder is multi-model and separate input, encoding and decoding nodes are provided in each layer for situational feature and environmental information. Other embodiments may also provide different nodes for sensed object-level behavioural data. In FIG. 6, the code layer with the greatest dimensional reduction compared to the input or output layers however provides a shared representation of all the features in the example embodiment of the autoencoder model shown in FIG. 6.

Figure 7:
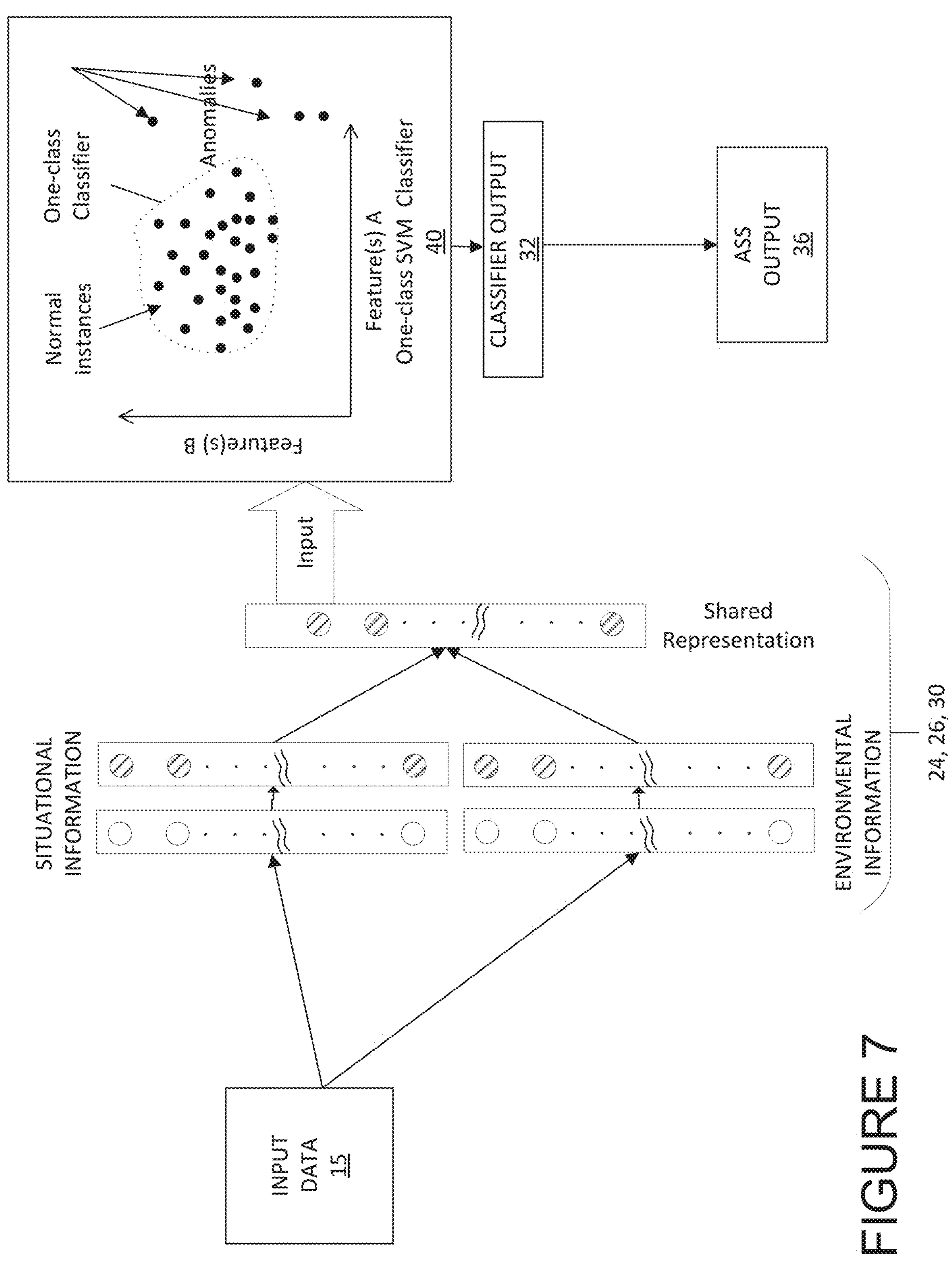
FIG. 7 shows in more detail an example of how a regression learning machine learning model of an accident similarity assessment module determines accident-similarity according to some embodiments of the disclosed technology.

FIG. 7 shows in more detail an example of how the regression-based machine learning model of FIG. 4C may also be multi-modal. In FIG. 7, the output of layers 24, 26, and 30 of 4C is fed into a one-class SVM classifier 40 which classifies the input as normal or anomalous. Normal instances represent accident-related driving experience events which are stored and anomalies may be discarded or their criticality scores used to determine if they should nonetheless be stored.

Various ways to implement a machine-learning model for use in the method 100 such as those shown in FIGS. 4A, 4B, 4C and FIGS. 5, 6 and 7 are known in the art which can be readily adapted to determine an accident similarity score. For example, see "High-dimensional and large-scale anomaly detection using a linear one-class SVM with deep learning" by Erafani et al, Pattern Recognition 58 (2016) pages 121-134, published by Elsevier. or the article entitled "Deep One-Class Classification" by Ruff et al, published in the Proceedings of the 35*th* International Conference on Machine Learning, Stockholm, Sweden, PMLR 80, 2018.

In some embodiments the ML modules 16 shown in FIGS. 4A, 4B and 4C comprise multi-modal ML models which may have different dimensions/different encoder/decoder parts for one or more of the different types of sensor data feeds, e.g. the behavioural data, situational information, and environmental information. In some embodiments, by separating the features input into the autoencoder according to their type it is possible to more efficiently encode (and later decode) them with different layers and dimensionality reduction to produce better output classifications.

Figure 8:
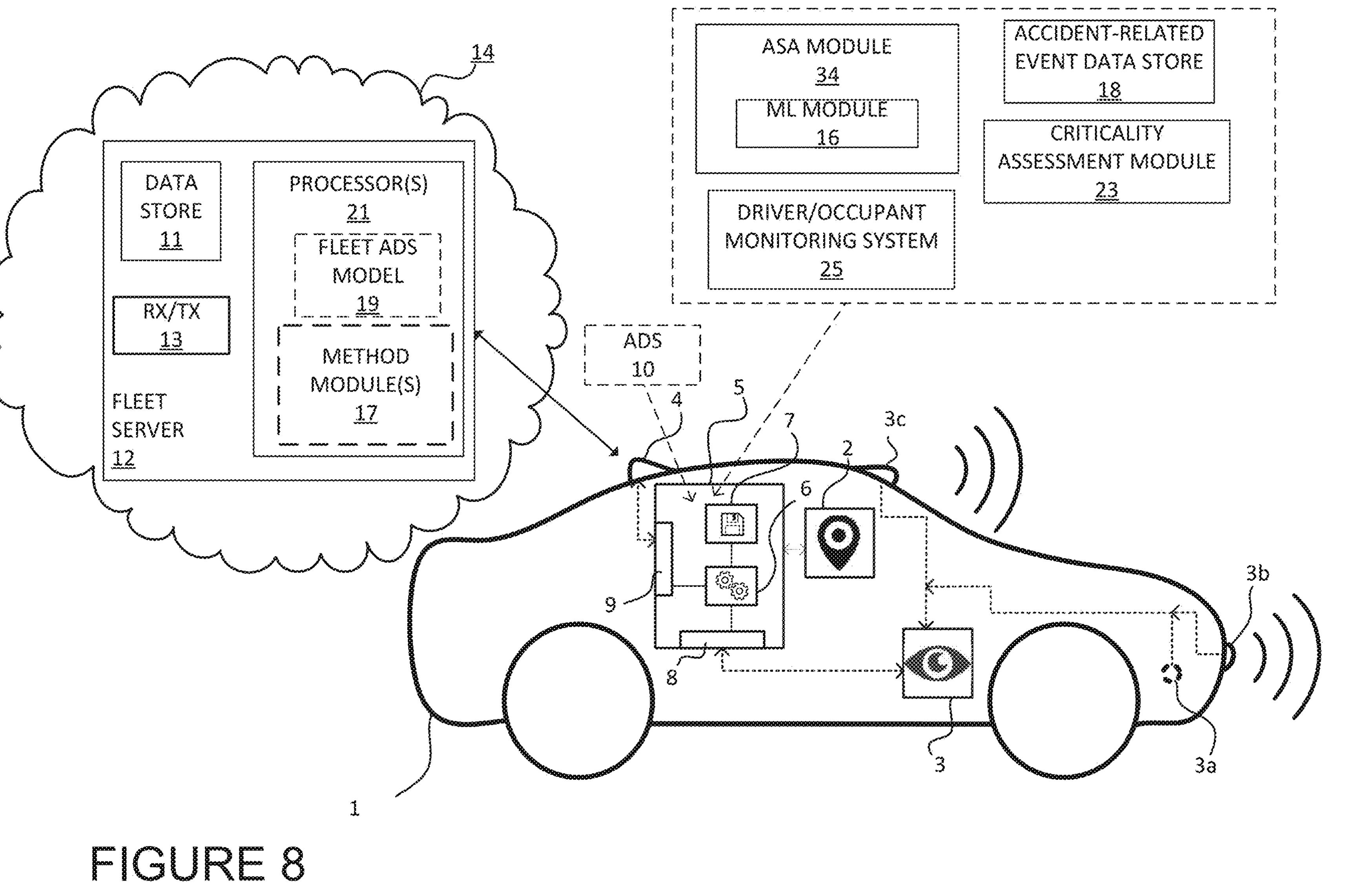
FIG. 8 shows a vehicle according to some embodiments of the disclosed technology.

FIG. 8 shows an example of a vehicle 1, for example, a vehicle in the fleet of vehicles 1A, 1B, 1C shown in FIG. 1. Each vehicle 1 comprises at least: a perception system 3 comprising at least one sensor 3A, 3B, 3C configured to monitor a surrounding environment of the ground vehicle and generate a sensor data stream, a localization system 2 configured to monitor a geographical map position of the ground vehicle 1 and to generate a localization data stream, a data transceiver 4 configurable to transmit to, and receive data from, a remote server 12; and a control system 5. In some embodiments, the data transceiver is used for V2X communications and the like, and it may also be used to connect to third-party information providers to obtain relevant data from remote data sources, for example, weather information and traffic information. The vehicle 1 may also include an ADS 10 in some embodiments. Some embodiments of the control system 5 comprise: a memory 7, a controller or control circuitry comprising one or more processors or processing circuitry 6 and computer code stored in the memory 7 which, when loaded from the memory 7 and executed by the one or more processors or processing circuitry or the controller or control circuitry 6, causes the control system 5 to perform an embodiment of method 100.

The control system 5 receives at least one sensory data stream or feed, either from the ADS 10 or directly from the perception system 3 also referred to herein as sensory system 3. Additional data streams or feeds may be provided in some embodiments to represent environmental or behavioural object-level data. As shown in FIG. 8, the control system 5 detects if there are any driving experience events in the received data feed(s) which comprise accident-related driving experience events, by implementing an embodiment of method 100.

The control system 5, or the ADS 10 of the control system 5, includes an ASA module 34, for example, as shown in FIG. 4A to 4C, 5, 6, or 7, which comprises an ML model 16 for assessing accident similarity of driving experience events detected by the sensory system 3 of the vehicle 1 based on sensory data and other data feeds. The control system 5 also includes a criticality assessment, CA, module 23 for assessing the criticality of driving experience events and a suitable data store 18 for holding accident-related driving experience event data until it can be transferred for subsequent analysis at a remote server 12. Any suitable method known in the art may be used to determine the criticality score. For example, in some embodiments, the criticality score for a data segment is dependent on a set of one or more accident criticality parameters representing one or more of: sensory information for the proximity of objects in the surrounding environment of the vehicle; object-level behavioural features; internal vehicle state features; vehicle state features; one or more occupant states; and a driver state. The criticality score may be determined by inputting the data segment into a deterministic, probabilistic and/or statistical, criticality assessment, CA, module 23 which then determines based on features extracted from the input data segment a criticality score for the input data segment.

The control system 5 receives data from various on-board sensor systems, such as the localization system 2 and perception system 3 of the ADS, together with data from other sources, for example, environmental or situational data sources which may be accessed from remote data sources either as a fused data or as separate data streams into an input buffer. The received data is input to a buffer for processing by the ASA module 34. The buffer may comprise part of memory 7 in some embodiments but in other embodiments may be configured as a separate memory store. The full (or a predetermined amount of fullness) of the input buffer of data forms a data segment which is then feed into the accident similarity assessment module 34 to determine if the input data segment represents an accident-related driving experience event when the vehicle 1 performs a method 100. The different data feeds may in some examples include data sampled or generated at different frequencies so that there may be interpolated data in some situations. Some interpolated data however may be discarded from the data in the buffer. The same data segment is also processed to determine the criticality score using a criticality score assessment module 23. This may be determined in parallel or sequential to determining the accident similarity score.

In some embodiments such as that shown in FIG. 2, the criticality score is determined only if the accident similarity score meets one or more conditions for the data segment to comprise accident-related driving experience event data.

In some embodiments of method 100, however, the criticality score is independently determined or determined even if the accident similarity score conditions for the input data to resemble a historic, known, type of accident-related driving experience event are not met, such as FIG. 3 shows. Advantageously, this enables new types of accident-related driving experience events to be detected using method 100.

The CA and ASA modules 23, 34 shown in FIG. 8 may be implemented using a processor or controller, for example, using processing or control circuitry, and/or computer code which is suitably configured so that the control system 5 is able to cause method 100 to be implemented on the vehicle. For example, as shown in FIG. 8, the control system 5 includes ASA module 34, CA module 23, a data-store or data stores 18 for the accident-related driving experience events that are detected by the accident similarity assessment module 34 and/or by the criticality score assessment module 23.

In some embodiments, as shown in FIG. 8, an occupant and/or driver monitoring system 25 is also provided to monitor driver and/or occupant state. This may be provided as part of the control system 5, for example, as part of the ADS 10 in some embodiments. This allows driver stress to be assessed even if the perception system 3 does not detect an object in front of the vehicle but a driver does. The driver/occupant monitoring system 25 may be used to provide data relating to a driver and/or occupant state to the accident similarity assessment module 34 and/or the criticality module 23. Although this data may not always be used, however, by including such data a more reliable (and so better) accident similarity score and/or criticality score may be determined even when the input data segment bears no resemblance to a historic accident or near-accident. For example, a driver state may be highly stressed based on pupil dilation and pulse measurements but no other features indicating a near accident may be located in the sensory data.

In some embodiments, the ADS 10 and/or the perception system 3 includes a data communications system for obtaining additional data feeds which form the input 15 into the ASA and CA modules 34, 23 from remote sources. For example, environmental data feed comprising third party information such as weather information and/or road conditions and/or hazard information may be obtained via a wireless connection from one or more remote sources and combined with sensory information to form input 15.

The sensory, perception, system 3 comprises a system configured to acquire raw sensor data from on-board sensors 3A, 3B, 3C, which is converted into scene understanding by the ADS. The localization system 2 is configured to monitor a geographical position and heading of the vehicle, and may take the form of a Global Navigation Satellite System, GNSS, such as a GPS. However, the localization system may alternatively be realized as a Real Time Kinematics, RTK, a GPS or a differential GPS in order to improve accuracy.

The perception system 3 architecture may comprise one or more electronic control modules and/or nodes of the ground vehicle 1 which are configured to interpret information received from a sensor system 3A, 3B, 3C of the vehicle 1 whilst the ground vehicle 1. In some embodiments, perception system 3 relies on and obtain inputs from multiple data sources, such as automotive imaging, image processing, computer vision, and/or in-car networking, etc., in combination with sensory information. The sensory information may for instance be derived from a sensor system comprising one or more detecting sensors 3A, 3B, 3C of the vehicle 1. In some embodiments, the detecting sensors 3A, 3B, 3C form a sensor array or sensor system providing object-level sensory information with 360 degree or nearly 360-degree coverage of a surrounding environment of the vehicle 1.

The perception system 3 is used to identify and/or track objects as the vehicle is driven, such as, for example, e.g. obstacles, road lanes, relevant signage, appropriate navigation paths etc. An accident experience or near accident experience encountered by the ADS 10 of the vehicle 1 should be reflected in the sensory information. The sensory information output by the ADS forms at least part, and may comprise all, of the input data 15 to the CA and ASA modules 23, 34 in some embodiments.

The system architecture of the control system 5 comprises one or more processors 6, a memory 7, a sensor interface 8 and a communication interface 9. The processor(s) 6 may also be referred to as a processor circuitry 6 or control circuit 6 or control circuitry 6. The control circuit 6 is configured to execute instructions stored in the memory 7 to manage and/or monitor the ADS 10 and to cause the ADS to provide input to allow a method 100 for detecting accident-related driving experience events to be performed according to any of the disclosed embodiments of the method 100 or the first aspect. The control circuit 6 is also configured to execute instructions held in memory to implement CA module 23 and the ASA module 34 used by method 100 on the input.

The memory 7 of the control system 5 comprises one or more (non-transitory) computer-readable storage mediums, for storing computer-executable instructions, which, when executed by one or more computer processors 6, for example, can cause the computer processors 6 to perform the disclosed on-board vehicle method 100 and to implement the disclosed functionality and techniques described herein which take place on-board the vehicle 1.

In some embodiments, memory 7 includes high-speed random-access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 7 is capable of storing computer code components and/or modules that may be used by the disclosed embodiments of method 100.

The processor control circuitry 6 is configured to process the data obtained from the sensor system comprising information about a surrounding environment of the ground vehicle 1. In some embodiments, the processor control circuitry 6 is configured to provide input data 15 comprising the contents of a buffer which has received one or more sensory or other data feeds, for example, as described above, into the ML module 16 of the ASA module 34. The input data 15 may thus comprises a data segment of one or more data streams including data fees from at least the vehicle's sensor system 3 such as object-level behavioural data and may also comprise data representing road, and other environmental conditions, as well as situational data such as a GPS location in some embodiments.

Any data segments for which the accident similarity score or criticality score meet the relevant storage conditions are stored as accident-related driving experience event data in one or more data store (s) or repositories 18, until it is time to transfer it to the remote server 12 for further analysis. The data is transferred from time to time via data interface and antenna system such as antenna 4 shown in FIG. 8 from the vehicle 1 to a fleet server 12.

The processor(s) 6 may in some embodiments be shared by the control system 5 and the ADS 10 and/or the ML model 16 and/or the accident similarity assessment module 34 and criticality assessment module 23 associated with the ADS 10. The processor(s) 6 may be or may include any number of hardware components for conducting data or signal processing or for executing computer code stored in memory 7. The control system 5 and the ADS 10, the ML model 16 and the accident similarity assessment module 34 may use dedicated or shared memory 7. Memory 7 may be one or more devices for storing data and/or computer code for completing or facilitating the various methods described in the present description.

The memory 7 may in some embodiments be shared by the control system 5 and the ADS 10 and/or the ML model 16 and/or the accident similarity assessment module 34. The memory 7 may include volatile memory or non-volatile memory of any suitable type. The memory 7 may include database components, object code components, script components, or any other type of information structure for supporting the various activities of the present description. In some embodiments, any distributed or local memory device may be utilized with the systems and methods of this description. In some embodiments the memory 7 is communicably connected to the processor 6, for example, via a circuit or any other wired, wireless, or network connection, and includes computer code for executing one or more processes described herein.

A sensor interface 8 may in some embodiments be shared by the control system 5 and the ADS 10. The sensor interface 8 may also provide the possibility to acquire sensor data directly or via dedicated sensor control circuitry 3 in the vehicle 1. The communication/antenna interface 9 of the ground vehicle 1 may further provide the possibility to send output to a remote location, for example, to a remote operator or control centre, such as the fleet server 12, by means of the antenna 4 via an external network 14. Moreover, some sensors in the vehicle 1 may communicate with the control system 6 using a local network setup, such as a controller area network, CAN bus, an inter-integrated circuit, I2C, an Ethernet, by using optical fibres, and so on. The communication interface 9 may be arranged to communicate with other control functions of the vehicle 1 and may thus be seen as control interface also; however, a separate control interface (not shown) may be provided. Local communication within the vehicle 1 may also be of a wireless type with protocols such as WiFi, a Long Range, LoRa, low-power wide-area network, Zigbee™, Bluetooth™, or one or more similar mid/short range wireless communications technologies.

In some embodiments, the same or different types of memory components 7 of the ground vehicle 1 stores the ASA module 34, the CA module 23, functions as the input buffer, and stores the output accident-related driving experience event data as well as the accident similarity score and criticality score of each accident-related driving experience event. Memory 7 may be provided in any suitable form of computer-accessible storage medium such as a tangible or non-transitory storage media or memory media such as electronic, magnetic, or optical media, e.g., disk or CD/DVD-ROM coupled to computer system via bus, or as some other form of persistent or semi-persistent memory. The memory 7 may include non-transitory and tangible memory.

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory.

For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

Some embodiments of the fleet server 12 shown in FIG. 1 comprise a server 12 as shown in FIG. 8, for collecting accident-related driving experience event data from a plurality of vehicles 1, each vehicle 1 having an on-board advance driving system, ADS 10 or similar source(s) of data for accident-related driving experience event detection.

As shown in FIG. 8, server 12 comprises a memory for holding coded instructions and also a memory or data store (both are shown as data store 11 in FIG. 8) to hold transferred data, means to send and receive data communications with the fleet shown as RX/TX 13, and one or more processors or control circuitry 21 which are able to execute instructions such as computer code to implement a method 200 to collect accident-related driving experience event data from vehicles 1. The computer code may be hard-coded and/or stored in a suitable memory 11. In some embodiment, one or more modules 17 provide the functionality for the server 12 to implement method 200. The modules 17 comprise software or processor or control circuitry which is held in memory 11 and which, when loaded from memory and executed by the processor or control circuitry, implement the method 200.

In some embodiments, the server 12 includes computer code which, when loaded from the memory 11 and executed by the one or more processors or processing circuitry 21 of the control circuitry or controller, causes the server to: receive 202, responsive to a data transfer triggering event occurring on one of the plurality of vehicles 1, data comprising at least one accident-related driving experience event that the vehicle 1 has detected, and store 204 the received accident-related driving experience event data with accident-related driving experience event data from at least one other vehicle.

In some embodiments, the method 200 of computer-implemented method for collecting accident-related driving experience event data from a plurality of vehicles 1, each vehicle 1 having an on-board advanced driving system, ADS, 10 which the server performs comprises: receiving 202, responsive to a data transfer triggering event occurring on at least one of the plurality of vehicles 1, data comprising at least one accident-related driving experience event that the vehicle 1 has detected; and storing 204 the received accident-related driving experience event data in one or more fleet accident-related experience data libraries. Each accident-related driving experience event received from the vehicle 1 comprises a data segment and at least an accident similarity score and an accident criticality score of the data segment. In some embodiments a driving experience event may comprise features from a plurality of sequential data segments which have been tracked over time before being confirmed as forming an accident-related driving experience event such as an accident or near-accident scenario of a new or known type.

The server may comprise a number of different types of memory such as, for example, memory (shown as data store 11 in FIG. 8) suitable to store any computer code which when executed may cause the server to execute method 200 and memory of a type suitable to store any received accident-related driving experience event data from the fleet vehicles 1. The server 12 also comprises a fleet ADS 19 which is a master or global version of the ADS 10 model on-board each vehicle 1 in the fleet of vehicles shown in FIG. 1 as vehicles 1A, 1B, 1C.

In some embodiments, server 12 analyses the received accident-related driving experience event data to improve the safety of the global ADS model which can then be used to update local copies on-board each vehicle in the fleet.

The criticality score determines, if there is now similarity to a known type of accident-related driving experience event, if the input 15 could comprise a new type of accident-related driving experience event. For example, a TCC based criticality score which meets a condition such as being below threshold TCC value, indicates that an accident-like situation was encountered by the vehicle but a collision was avoided. The combination of a high accident similarity score and a low criticality score could indicate that the vehicle handled a situation where historically accidents resulted in a far better way. In contrast, if the similarity score is low, and the criticality score is high, could mean that a new type of accident was encountered if a collision occurs.

FIG. 9A shows two examples of typical accident-related driving experience events a vehicle 1 could encounter whilst it is being driven. The top example of FIG. 9A shows an accident experienced by the left-hand-side vehicle after it has overtaken the right-hand side vehicle. The overtaking vehicle collides with a pedestrian as the pedestrian was not observable until too late for the overtaking vehicle to brake sufficiently to avoid the collision. The bottom example of FIG. 9A shows a near-accident experienced by two vehicles when the topmost vehicle cuts from the right into the right lane of the two-lane road. In this example, the middle vehicle has had to swerve at speed to avoid a collision with the vehicle that has cut in and/or has braked at a pace which has not allowed the following vehicle it to brake in time to avoid a collision. Both examples may be represented by accident-related driving experience event data with high critical scores based on the TTC being zero (as a collision occurs).

FIG. 9B shows two examples of similar driving experience events to those shown in FIG. 9A which would be expected to have high accident similarity scores (as FIG. 9B shows driving experience events which resemble the accident-related driving experience events in FIG. 9A) and low criticality scores as no collisions occur so the driving experience events do not represent safety critical situations.

In contrast, FIG. 9C shows two examples of driving experience events which would have accident similarity scores indicating they resemble the accident-related driving experience events of FIG. 9A, but which would have high criticality scores based on their TTC metrics being low but not zero as no collision occurs.

Advantageously, the disclosed technology allows the ADS or any other on-board sensory perception data streams to be filtered so that a number of different types of driving experience events can be transferred to a remote server without needing to transfer irrelevant driving experience event data. The disclosed embodiments of methods 100 allow driving experience events which comprise new types of accident-related driving experience events and/or driving experience events which resemble known types of accident-related driving experience events to be detected, collected and stored, by a vehicle's ADS in a way which reduces the amount of data that needs to be stored.

Another benefit of some embodiments of the disclosed technology is that federated learning can be used to share new accident experiences in a manner which avoids the need to migrate personal accident data which might not be permitted in some countries.

It should be understood that some parts of the described solution may be implemented either in the vehicle, in a system located external the vehicle, or in a combination of internal and external the vehicle; for instance, in a server in communication with the vehicle, a so-called cloud solution, as already exemplified. The server 12 may comprise a distributed system in some embodiments.

The different features and steps of the embodiments may be combined in other combinations than those described. Although the figures may show a specific order of method steps, the order of the steps may differ from what is depicted. In addition, two or more steps may be performed concurrently or with partial concurrence. Such variation will depend on the software and hardware systems chosen and on designer choice. Software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art. A person skilled in the art will realize that the present disclosure is not limited to the preferred embodiments described above and that various modifications, variations and functional equivalents are possible within the scope of the appended claims.

The invention claimed is:

1. A computer-implemented method performed by a control system to detect and collect accident-related driving experience event data on a vehicle, the method comprising:
- receiving a driving experience data stream from a source on-board the vehicle, wherein the source comprises an on-board advanced driver assistance system (ADAS) or an on-board autonomous driving (AD) system and the driving experience data stream comprises situational, environment, or behavioral sensory information;
- determining an accident similarity score for a data segment of the driving experience data stream by inputting the data segment into an accident similarity assessment module comprising a machine learning model trained to extract features from an input data segment using historic accident or historic near-accident driving experience event data to extract features and compute the accident similarity score, wherein the accident similarity score is based on a similarity measurement of data features extracted from the data segment to data features of historical accident or near-accident driving experience events;
- determining a criticality score for the data segment;
- storing, in dependence on the determined accident similarity score and the determined criticality score, at least the extracted data features from the data segment, without the entire data segment, as an accident-related driving experience event in association with at least the determined criticality score, the accident similarity score and the criticality score being determined independently of one another; and
- responsive to a transfer-triggering event, actuating a data transceiver of the vehicle to transmit the stored accident-related driving experience event to a remote server.

2. The method of claim 1, wherein the storing comprises storing at least the extracted data features as an accident-related driving experience event based on the accident similarity score meeting a similarity accident score condition.

3. The method of claim 1, wherein the storing comprises storing the data segment including the extracted data features as an accident-related driving experience event based on the determined criticality score of the data segment meeting a criticality score condition.

4. The method of claim 1, wherein the data features extracted from the data segment represent one or more or all of:
- driver state features;
- occupant state features;
- behavioural features, including vehicle state and other objects;
- environmental features; and
- situational features.

5. The method of claim 1, wherein determining the accident similarity score of the data segment comprises:
- extracting features from the data segment using the accident similarity assessment module; and
- determining the accident similarity score for the data segment based on a measurement of the similarity of the extracted features with historic accident and historic near-accident driving experience event features.

6. The method of claim 5, wherein based on the determined accident similarity score not meeting a threshold score condition for the data segment to be associated with a historic accident or a near-accident driving experience event, the method further comprises:
- determining, based on the criticality score meeting a threshold criticality score condition, the data segment comprises a different type of accident or near accident driving experience event to the historic accident or near-accident event.

7. The method of claim 1, wherein determining an accident similarity score and/or determining a criticality score for a data segment of the data stream comprises determining an accident similarity score and/or a criticality score for each of a plurality of time-sequential data segments.

8. The method of claim 1, wherein the criticality score is dependent on a set of one or more accident criticality parameters representing one or more of:
- sensory information for the proximity of objects in the surrounding environment of the vehicle;
- object-level behavioural features;
- internal vehicle state features;
- vehicle state features;
- one or more occupant states;
- a driver state.

9. The method of claim 8, wherein the criticality score is determined by inputting the set of accident criticality parameters into a deterministic, probabilistic and/or statistical, accident criticality assessment module.

10. A control system of a vehicle, the control system comprising:
- a memory;
- a controller or control circuitry comprising one or more processors or processing circuitry;
- computer code stored in the memory, wherein, when the computer code is loaded from the memory and executed by the one or more processors or processing circuitry of the controller or control circuitry, the control system is caused to perform the method of claim 1.

11. A ground vehicle, the vehicle comprising:

a perception system comprising at least one sensor configured to monitor a surrounding environment of the ground vehicle and generate a sensor data stream;

a localization system configured to monitor a geographical map position of the ground vehicle and to generate a localization data stream;

a data transceiver configurable to transmit to, and receive data from, a remote server; and a control system according to claim 10.

* * * * *